(12) United States Patent
Tsuda et al.

(10) Patent No.: US 12,317,308 B2
(45) Date of Patent: May 27, 2025

(54) WIRELESS COMMUNICATION DEVICE

(71) Applicant: SONY GROUP CORPORATION, Tokyo (JP)

(72) Inventors: Shinichiro Tsuda, Tokyo (JP); Kosuke Aio, Tokyo (JP); Sawako Kiriyama, Tokyo (JP); Ken Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 385 days.

(21) Appl. No.: 17/767,358

(22) PCT Filed: Jul. 14, 2020

(86) PCT No.: PCT/JP2020/027315
§ 371 (c)(1),
(2) Date: Apr. 7, 2022

(87) PCT Pub. No.: WO2021/075105
PCT Pub. Date: Apr. 22, 2021

(65) Prior Publication Data
US 2022/0386317 A1    Dec. 1, 2022

(30) Foreign Application Priority Data
Oct. 17, 2019    (JP) .................. 2019-189878

(51) Int. Cl.
H04W 72/56    (2023.01)
H04W 16/14    (2009.01)
H04W 72/044   (2023.01)

(52) U.S. Cl.
CPC ......... H04W 72/56 (2023.01); H04W 72/046 (2013.01); H04W 16/14 (2013.01)

(58) Field of Classification Search
CPC ... H04W 72/56; H04W 72/046; H04W 16/14; H04W 16/28; H04W 72/542;
(Continued)

(56) References Cited

U.S. PATENT DOCUMENTS

2007/0140377 A1    6/2007  Murakami et al.
2008/0025211 A1*   1/2008  Karaoguz ............ H04L 1/0017
                                                        370/469
(Continued)

FOREIGN PATENT DOCUMENTS

CN    1883145 A    12/2006
CN    101115077 A   1/2008
(Continued)

OTHER PUBLICATIONS

International Search Report and Written Opinion of PCT Application No. PCT/JP2020/027315, issued on Sep. 24, 2020, 09 pages of ISRWO.

*Primary Examiner* — Ricky Q Ngo
*Assistant Examiner* — David M Kayal
(74) *Attorney, Agent, or Firm* — CHIP LAW GROUP

(57) ABSTRACT

A plurality of pieces of data is properly transmitted with use of a plurality of beams. Data generated in an application is divided into a plurality of pieces of data, different priorities are assigned to the plurality of pieces of data, and the plurality of pieces of data is transmitted with a plurality of beams. A beam quality acquiring section acquires quality of each of the plurality of beams. A beam evaluating section performs evaluation of the plurality of beams on the basis of quality of each of the beams. A beam assigning section determines a correspondence between the plurality of beams and the plurality of pieces of data on the basis of evaluation of the beams and the priorities of data. A controller controls a transmitter to transmit the plurality of pieces of data through the corresponding plurality of beams.

18 Claims, 28 Drawing Sheets

(58) Field of Classification Search
CPC ........ H04W 72/04; H04W 72/12; H04B 7/06;
H04B 7/08; H04B 7/0617; H04B 7/086;
H04L 27/00
See application file for complete search history.

(56) References Cited

U.S. PATENT DOCUMENTS

| | | | |
|---|---|---|---|
| 2008/0025268 A1 | 1/2008 | Honary et al. | |
| 2009/0028151 A1* | 1/2009 | Schmidt | H04N 21/23611 |
| | | | 370/392 |
| 2009/0052578 A1* | 2/2009 | Sawai | H04B 7/0854 |
| | | | 375/299 |
| 2013/0265961 A1* | 10/2013 | Van Phan | H04W 72/563 |
| | | | 370/329 |
| 2016/0187149 A1* | 6/2016 | Goto | G08G 1/0112 |
| | | | 701/522 |
| 2017/0215152 A1 | 7/2017 | Byun et al. | |
| 2017/0367139 A1* | 12/2017 | Jang | H04W 16/14 |
| 2020/0350958 A1* | 11/2020 | Zhou | H04B 7/0695 |
| 2023/0344497 A1* | 10/2023 | Wang | H04B 7/0639 |
| 2024/0080806 A1* | 3/2024 | Freda | H04W 28/0268 |

FOREIGN PATENT DOCUMENTS

| | | |
|---|---|---|
| EP | 1684454 A1 | 7/2006 |
| EP | 1883183 A2 | 1/2008 |
| EP | 3174348 A1 | 5/2017 |
| JP | 2005-252380 A | 9/2005 |
| WO | 2005/050885 A1 | 6/2005 |
| WO | 2008/090836 A1 | 7/2008 |
| WO | 2016/024644 A1 | 2/2016 |

* cited by examiner

[ FIG. 1 ]
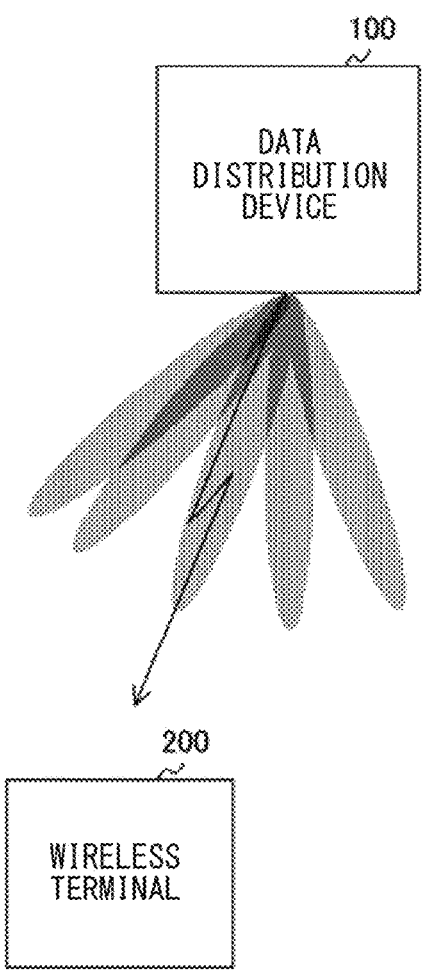

[FIG. 2]
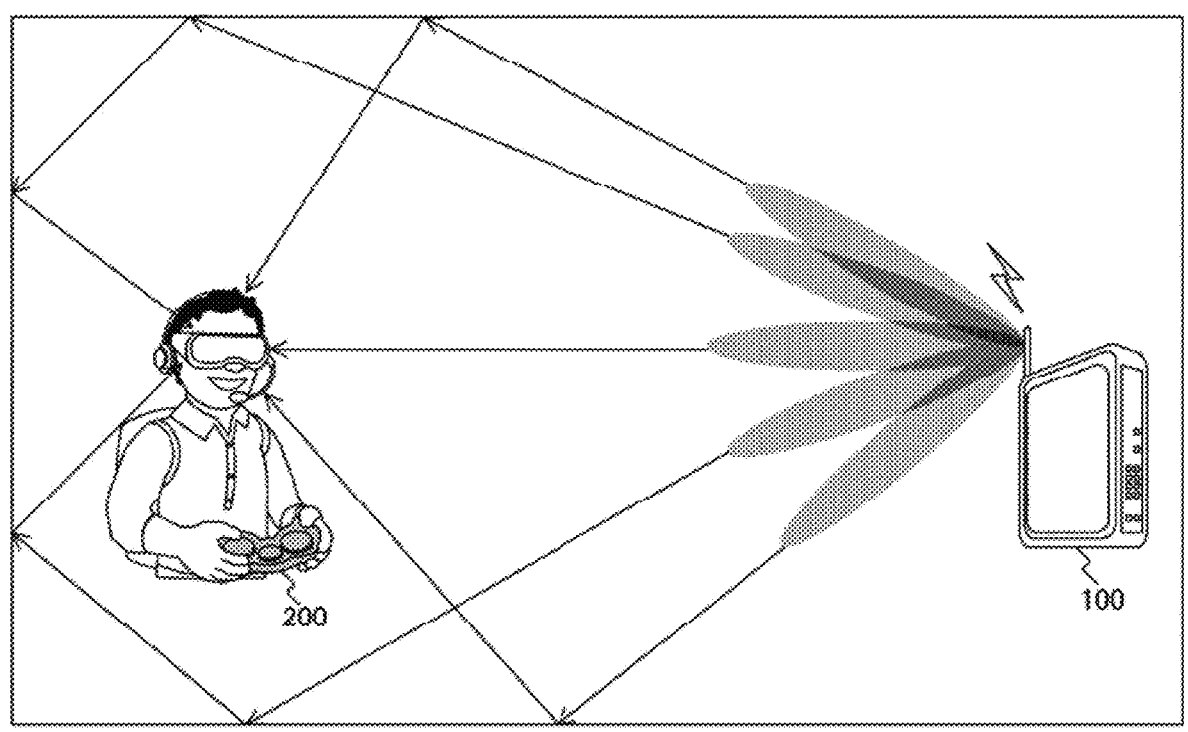

[FIG. 3]
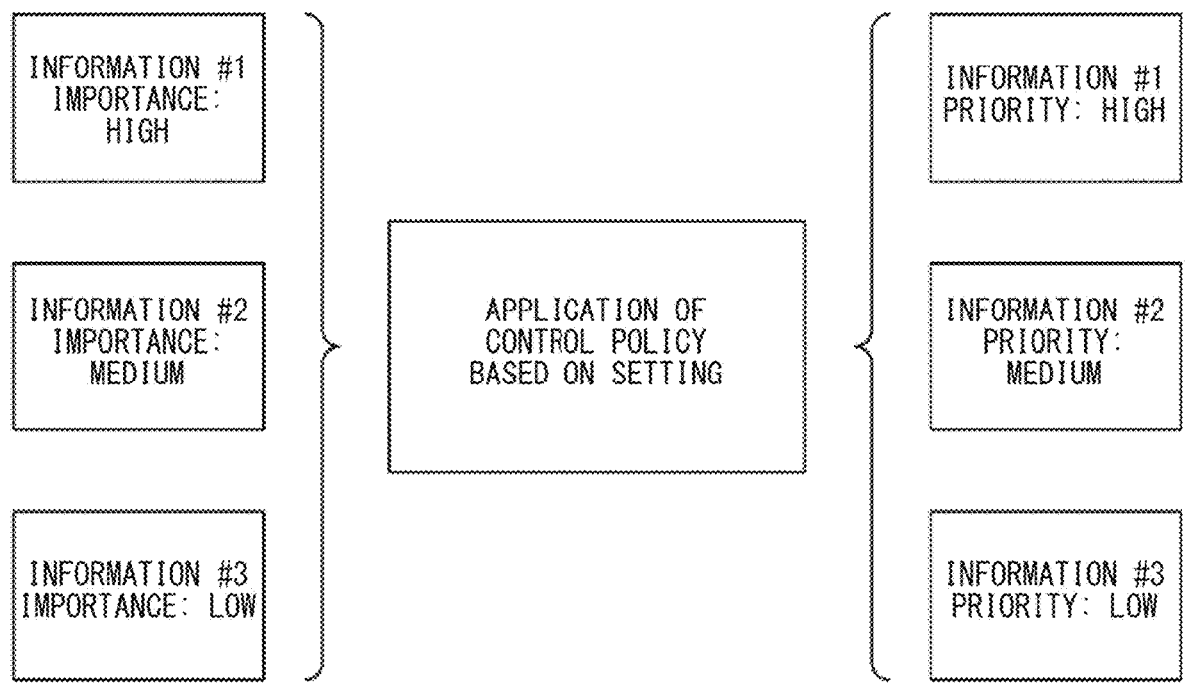

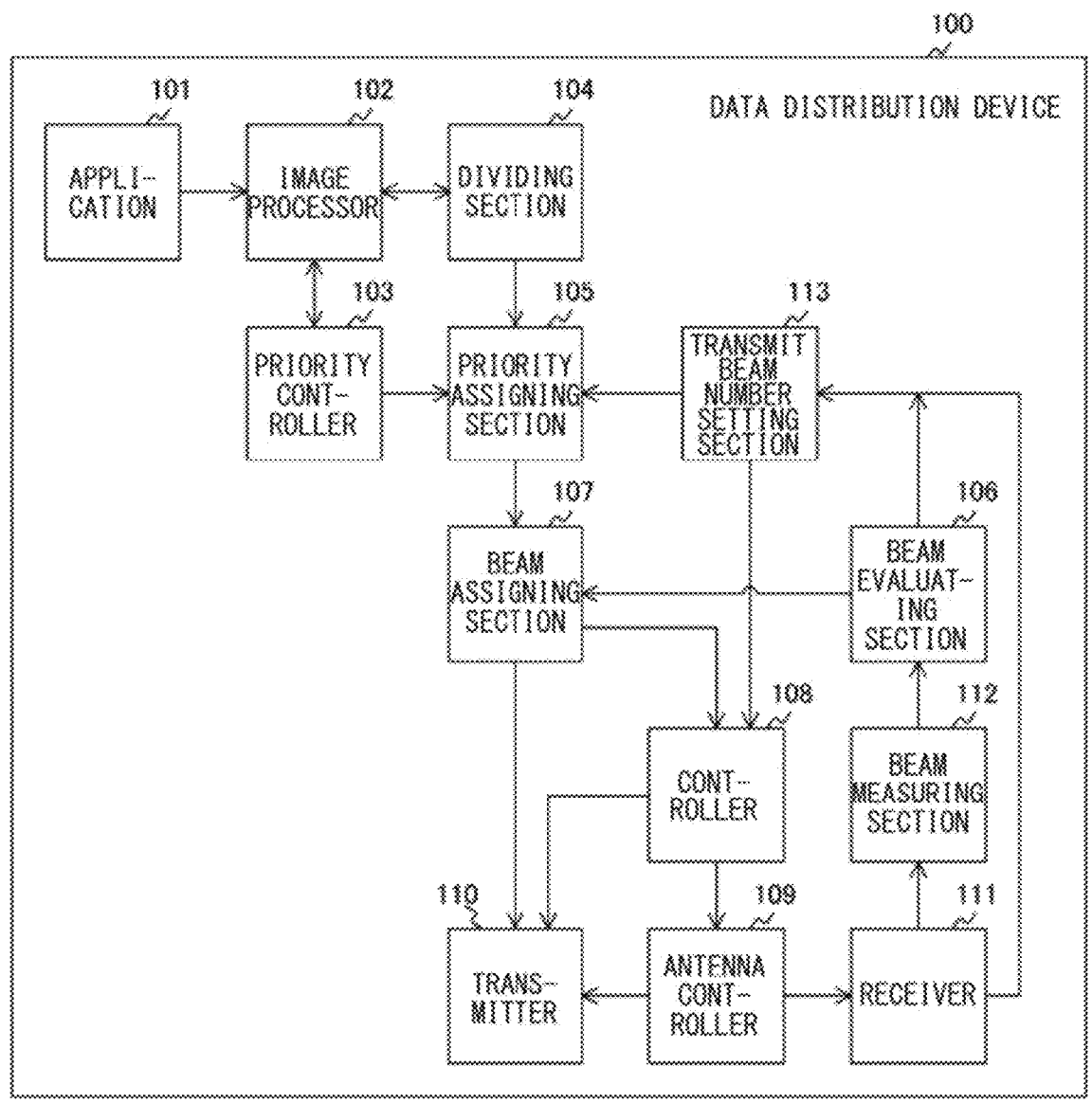

[FIG. 5]
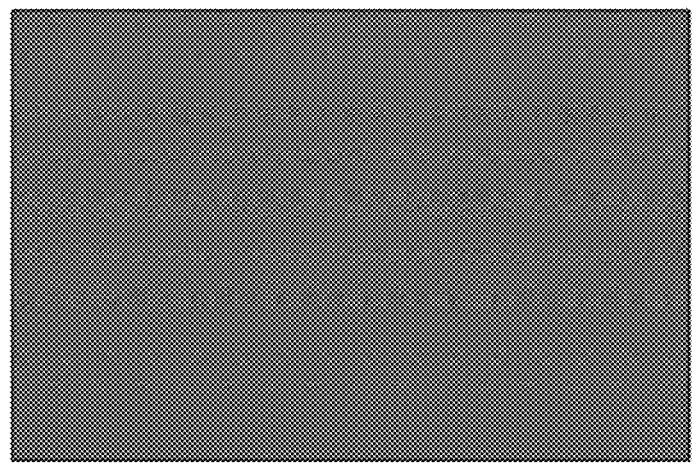
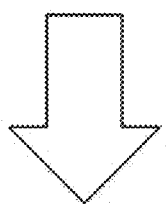
DATA AMOUNT REDUCTION IN ACCORDANCE WITH IMPORTANCE
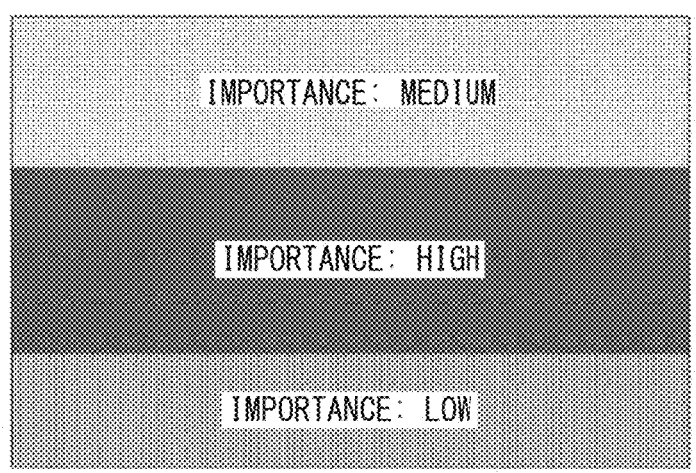

[ FIG. 6 ]
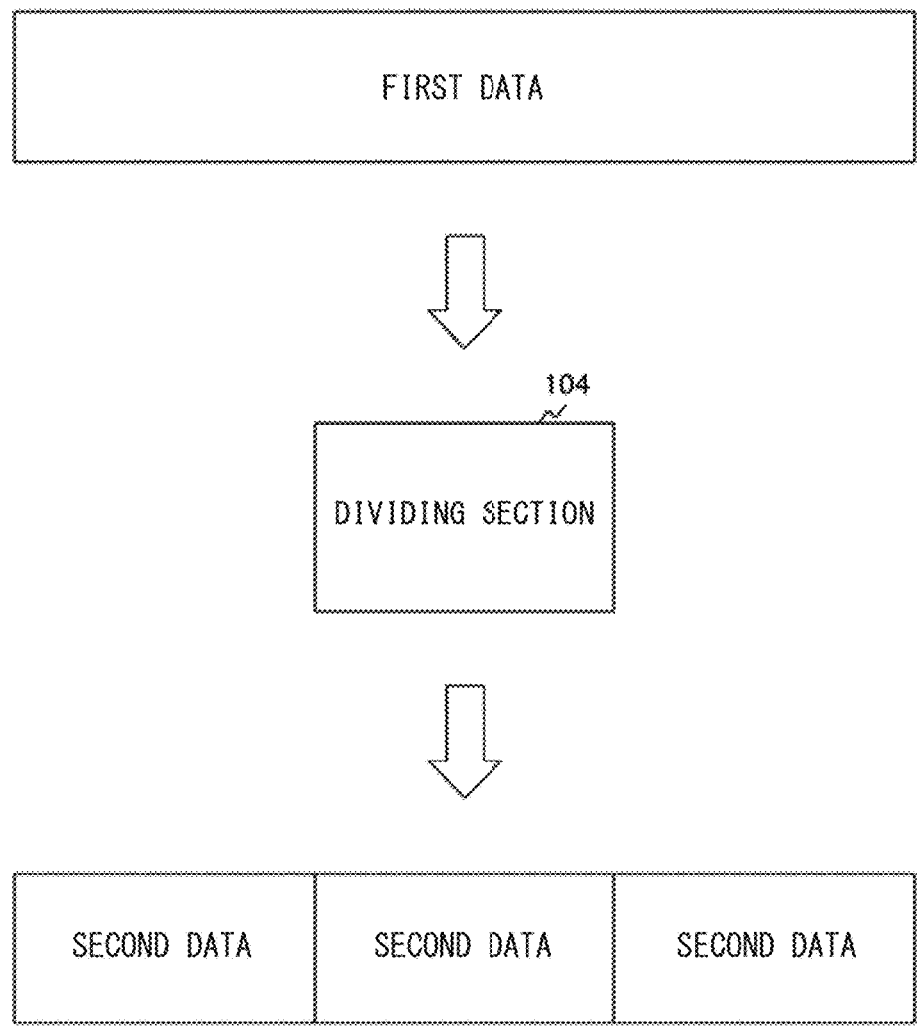

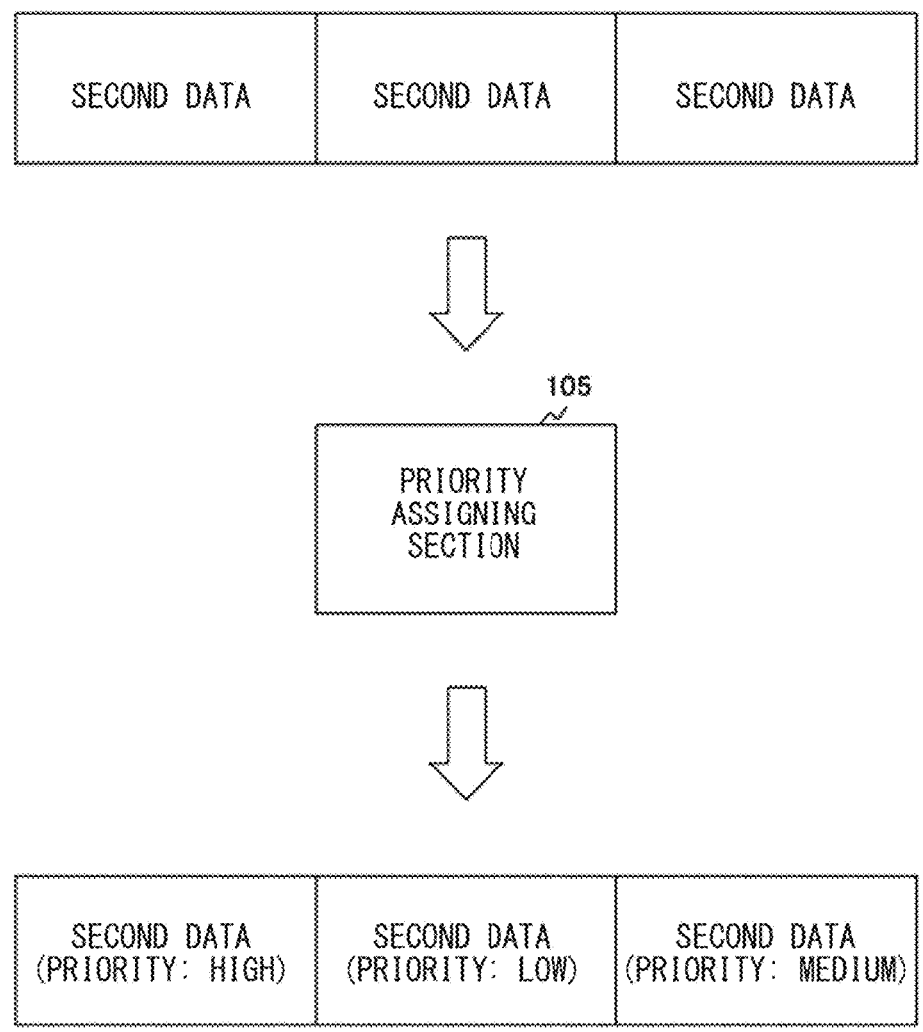
[ FIG. 7 ]

[FIG. 8]
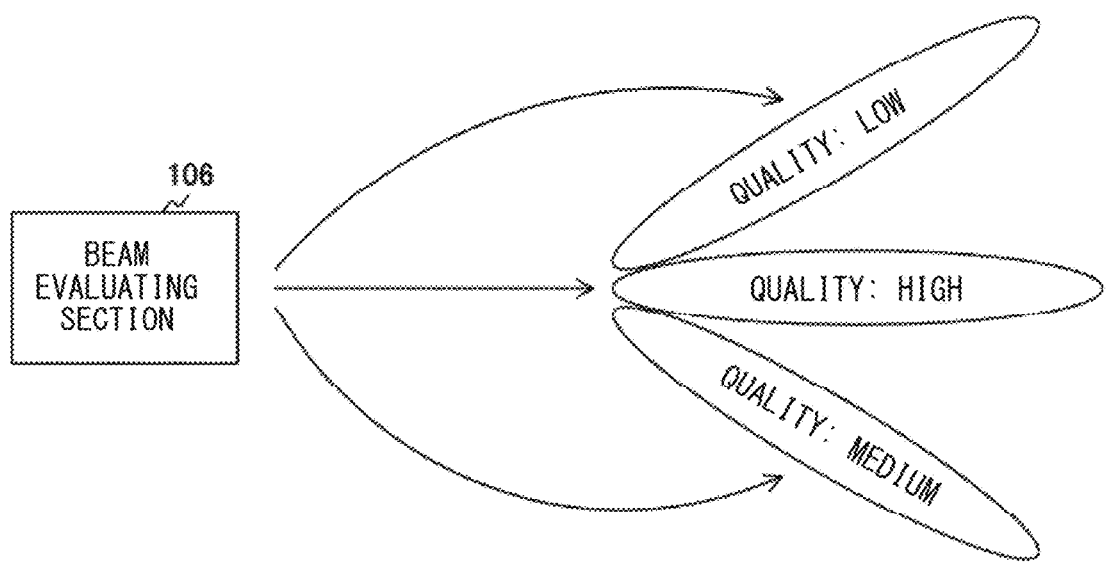

[FIG. 9]
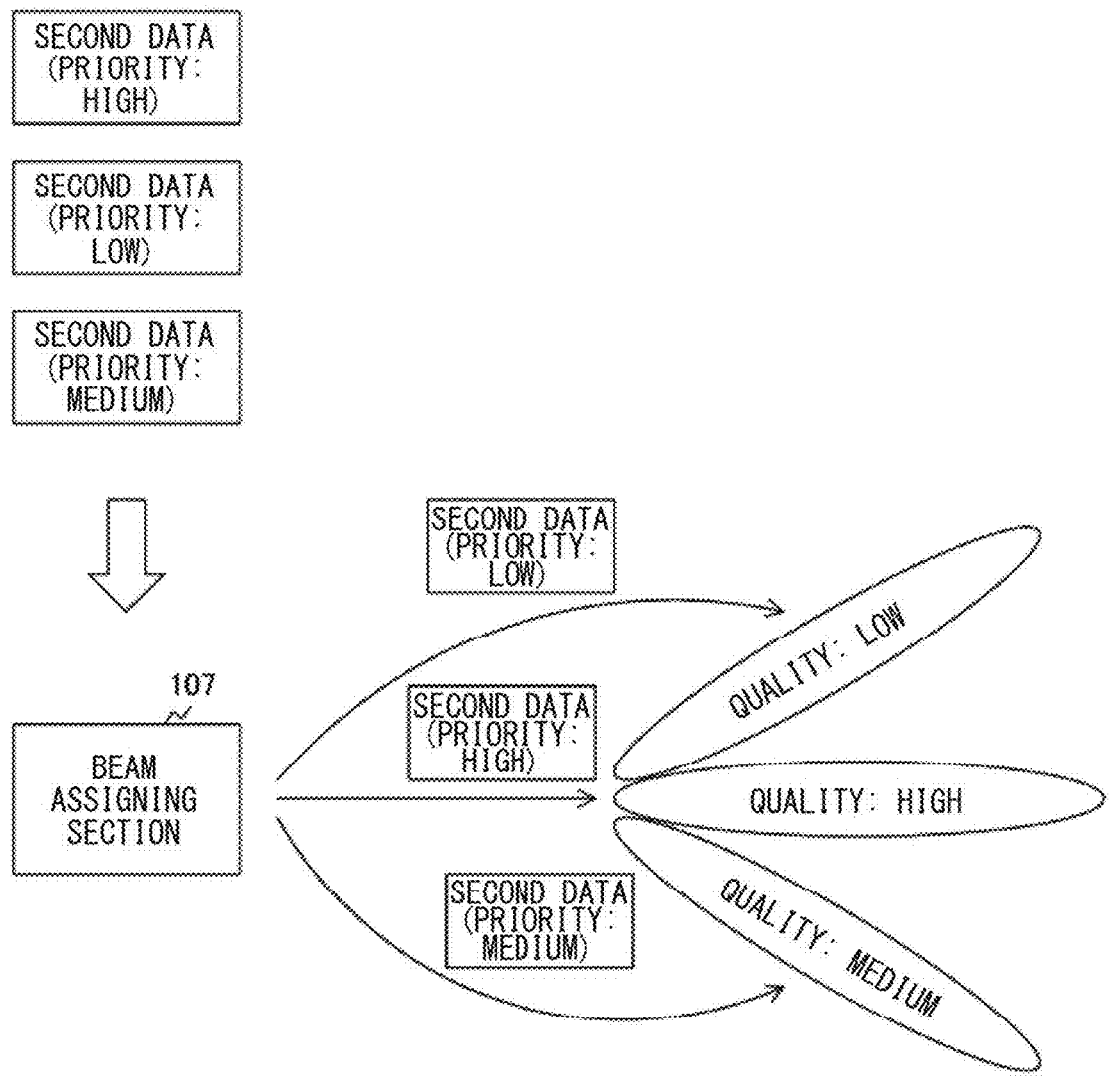

[ FIG. 10 ]
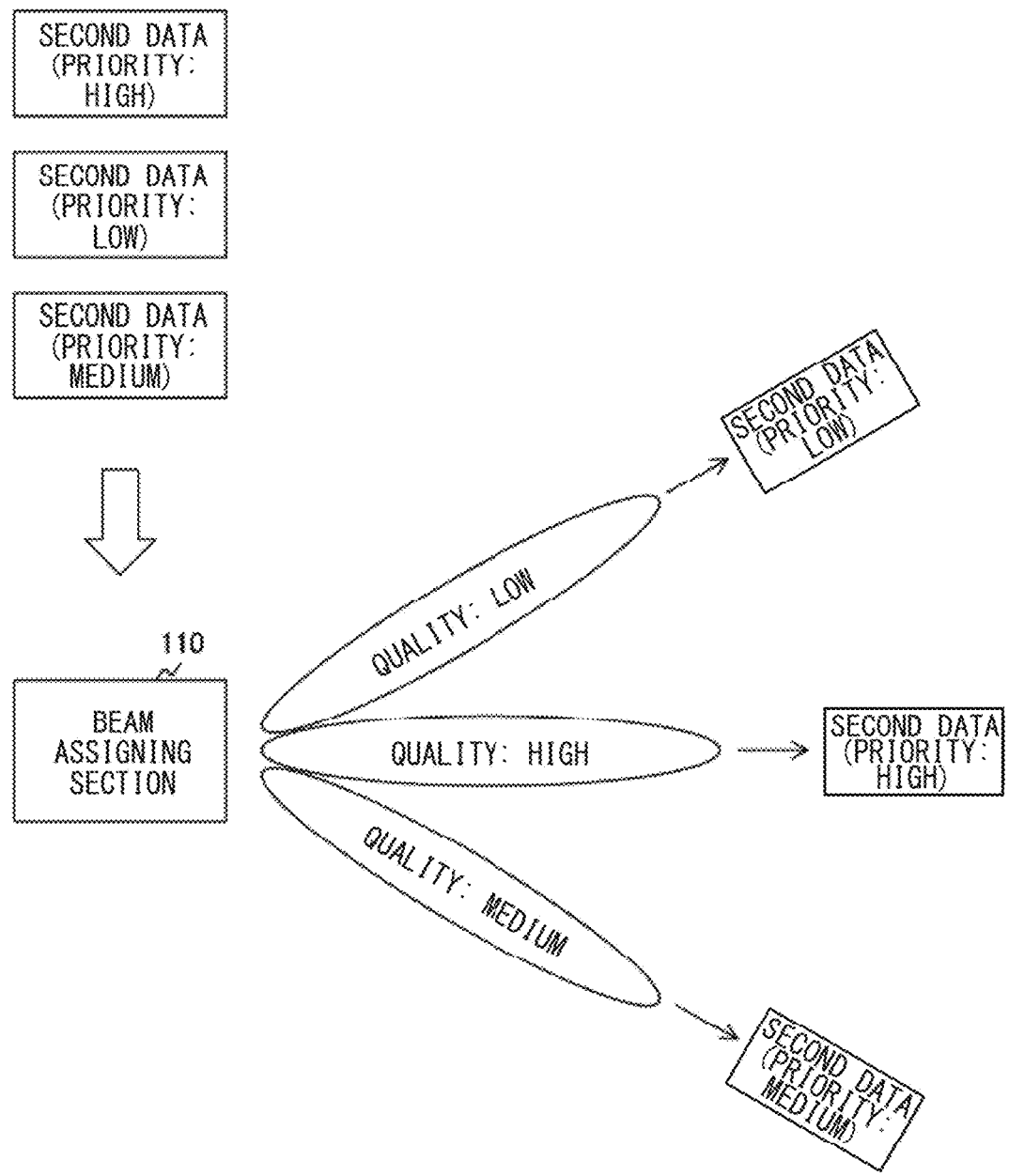

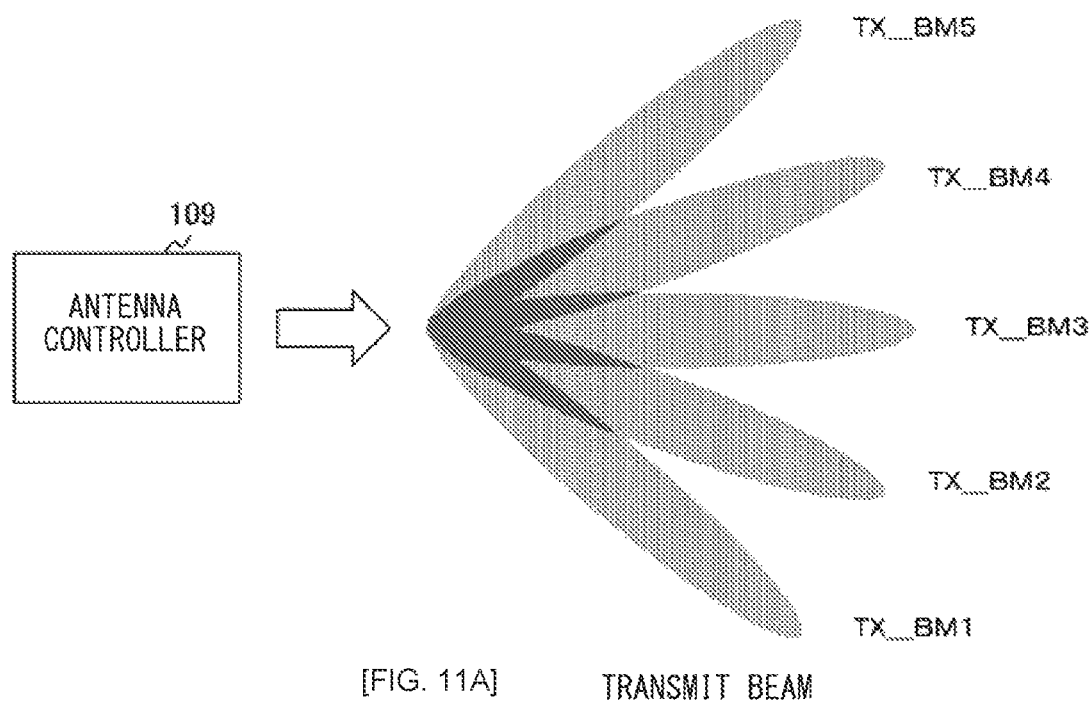
[FIG. 11A] TRANSMIT BEAM
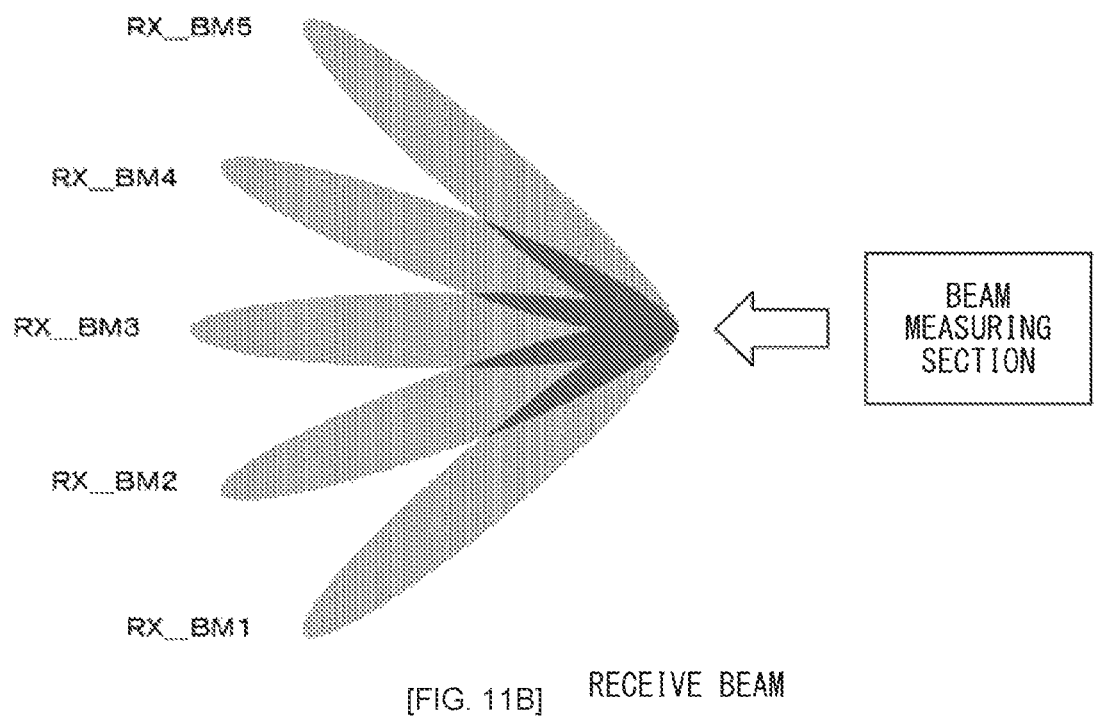
[FIG. 11B] RECEIVE BEAM

[FIG. 12]
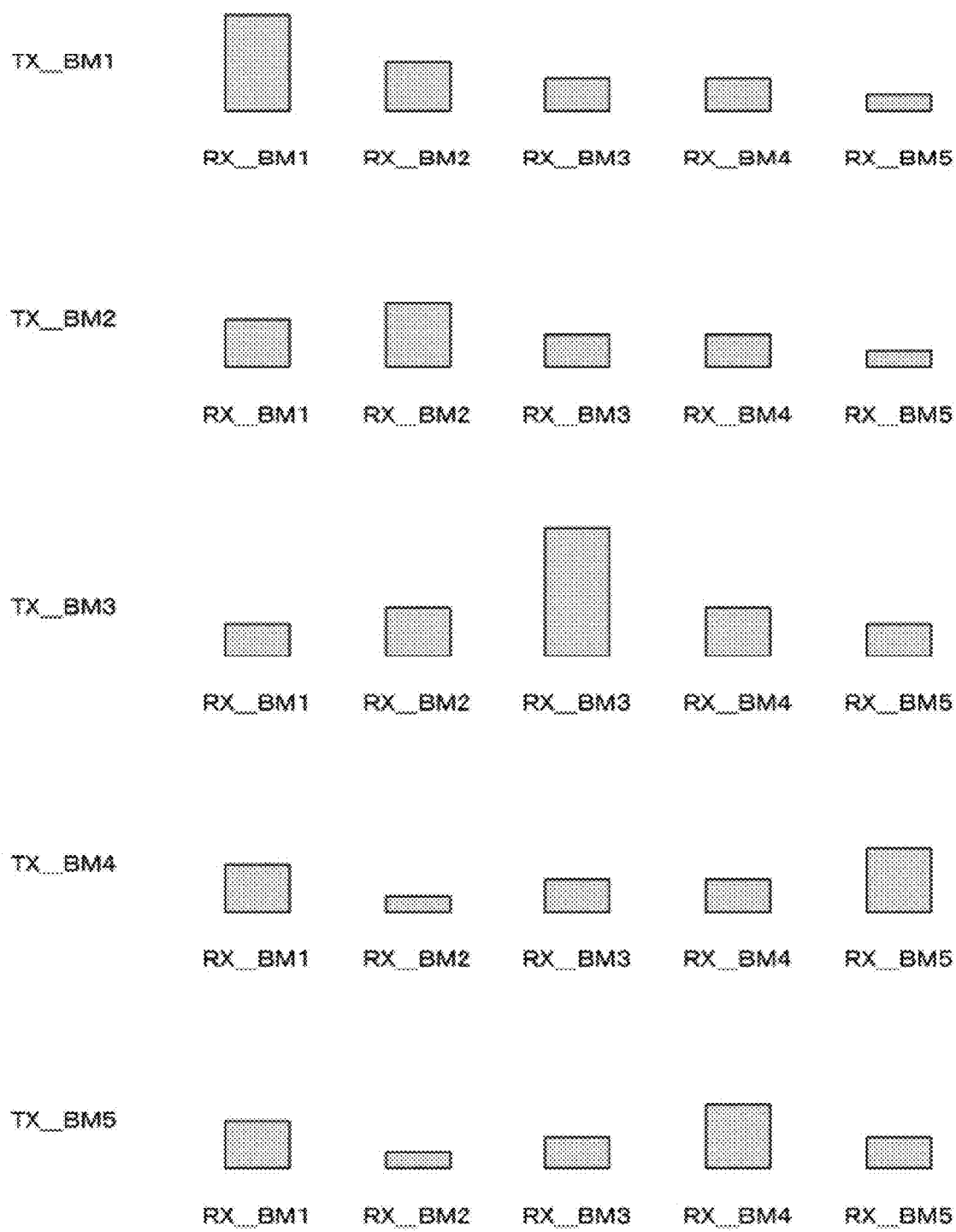

[ FIG. 13 ]

| | BEAM RANKS | CORRESPONDING BEAM |
|---|---|---|
| 1 | TX_BM3 | RX_BM3 |
| 2 | TX_BM1 | RX_BM1 |
| 3 | TX_BM2 | RX_BM2 |
| 4 | TX_BM4 | RX_BM5 |
| 5 | TX_BM5 | RX_BM4 |

[ FIG. 14 ]

| | BEAM RANKS | CORRESPONDING BEAM |
|---|---|---|
| 1 | TX_BM3 | RX_BM3 |
| 2 | TX_BM1 | RX_BM1 |
| 3 | TX_BM2 | RX_BM2 |
| 4 | TX_BM4 | RX_BM5 |
| 5 | TX_BM5 | RX_BM4 |

Rows 1–3: SPATIAL MULTIPLEXING
THRESHOLD
Rows 4–5: DIVERSITY

[ FIG. 16 ]
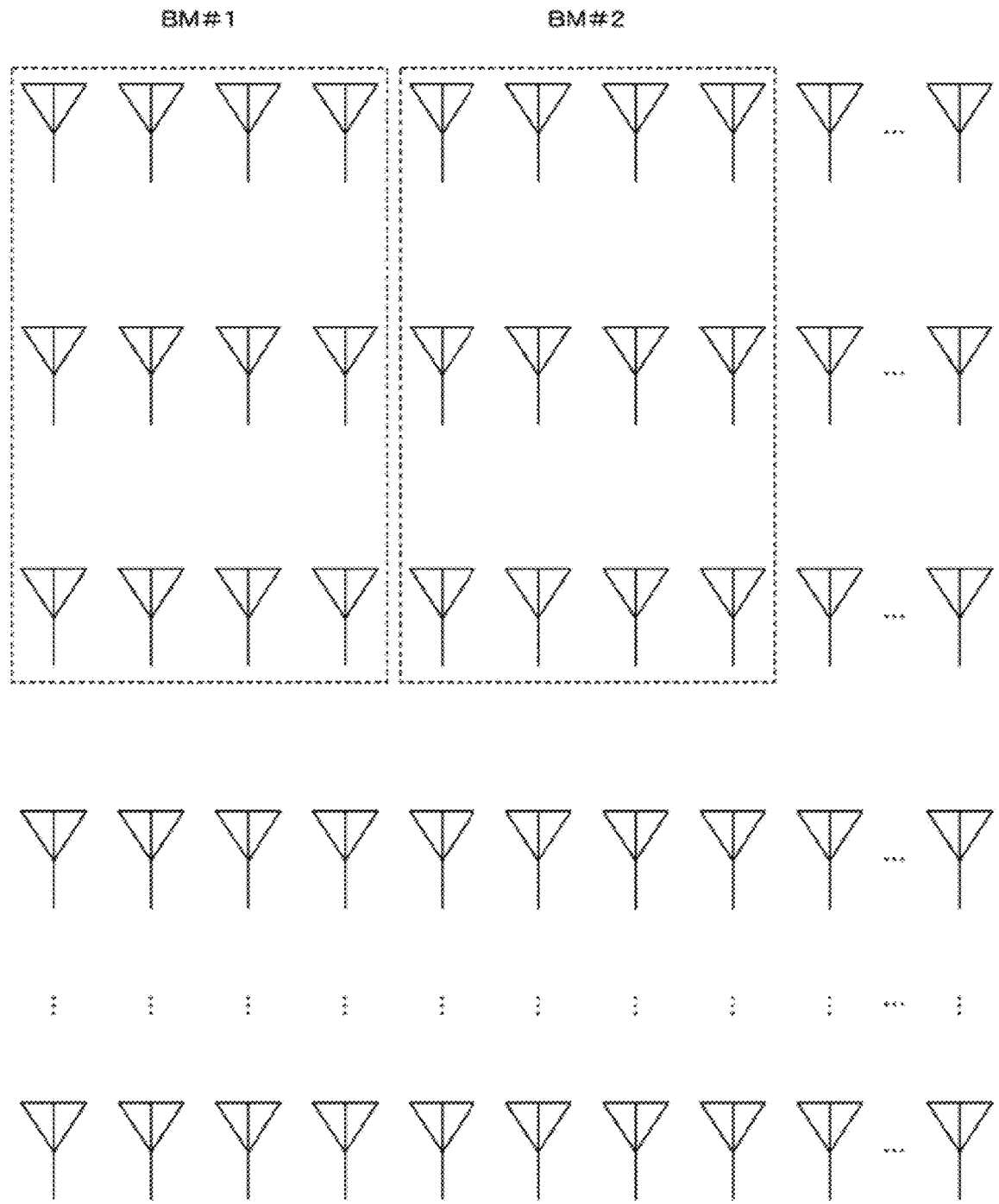

[FIG. 17]
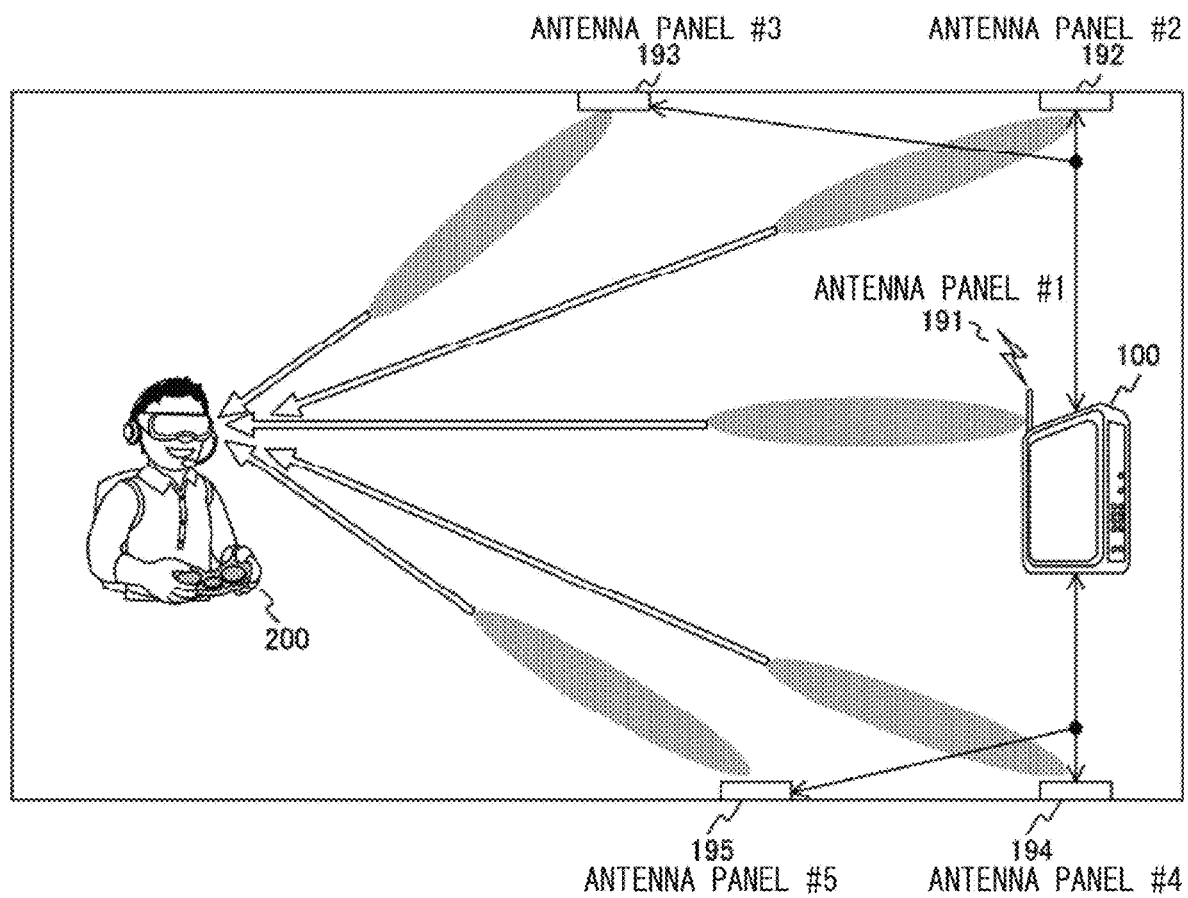

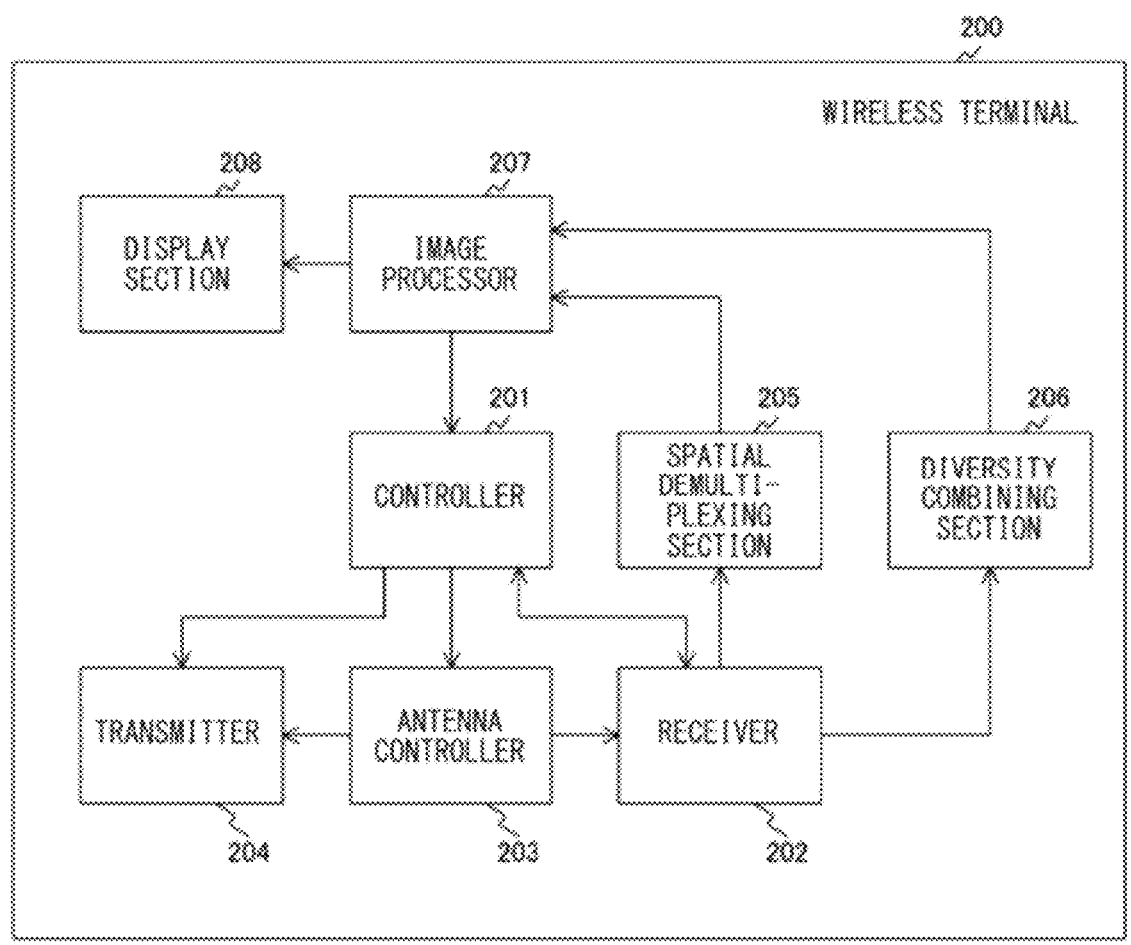
[FIG. 18]

[FIG. 19]
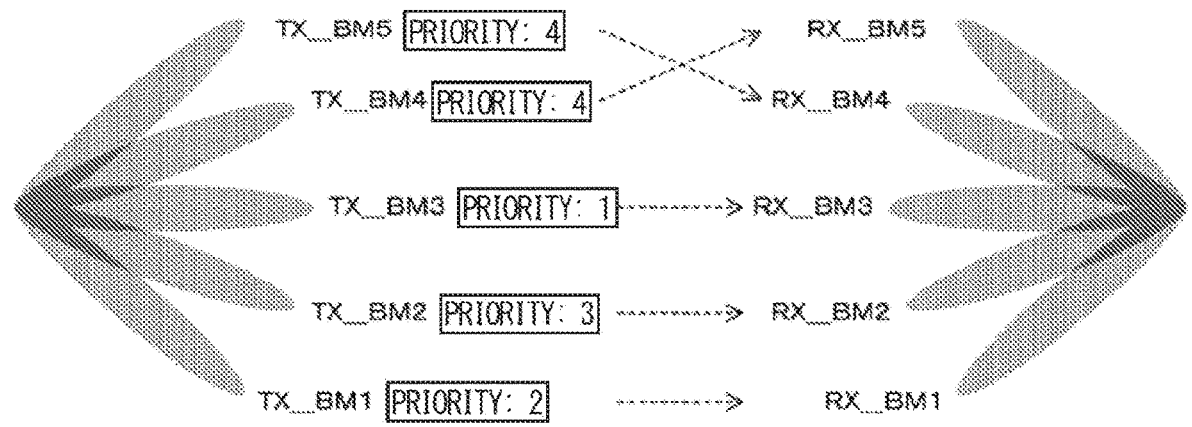
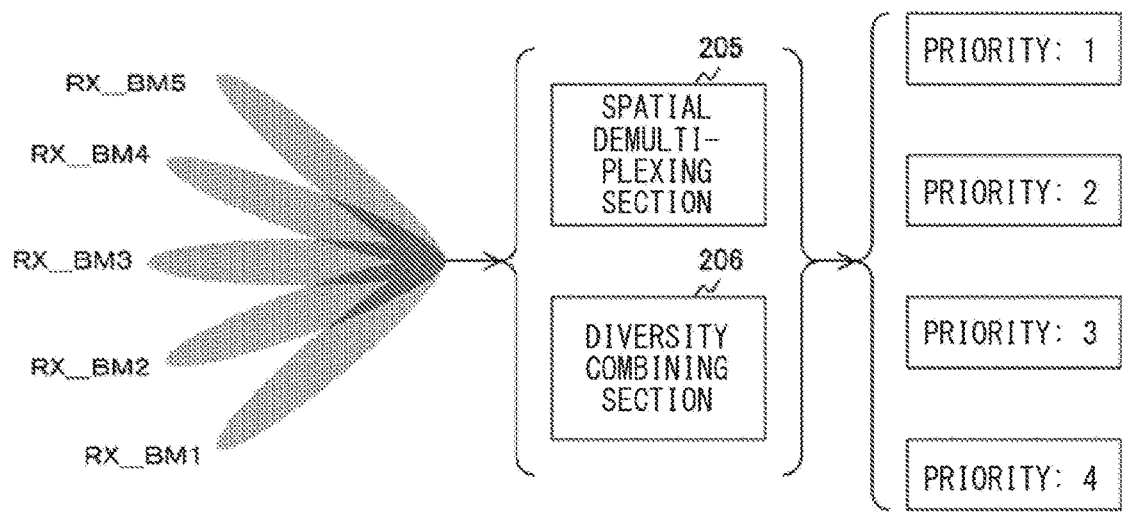

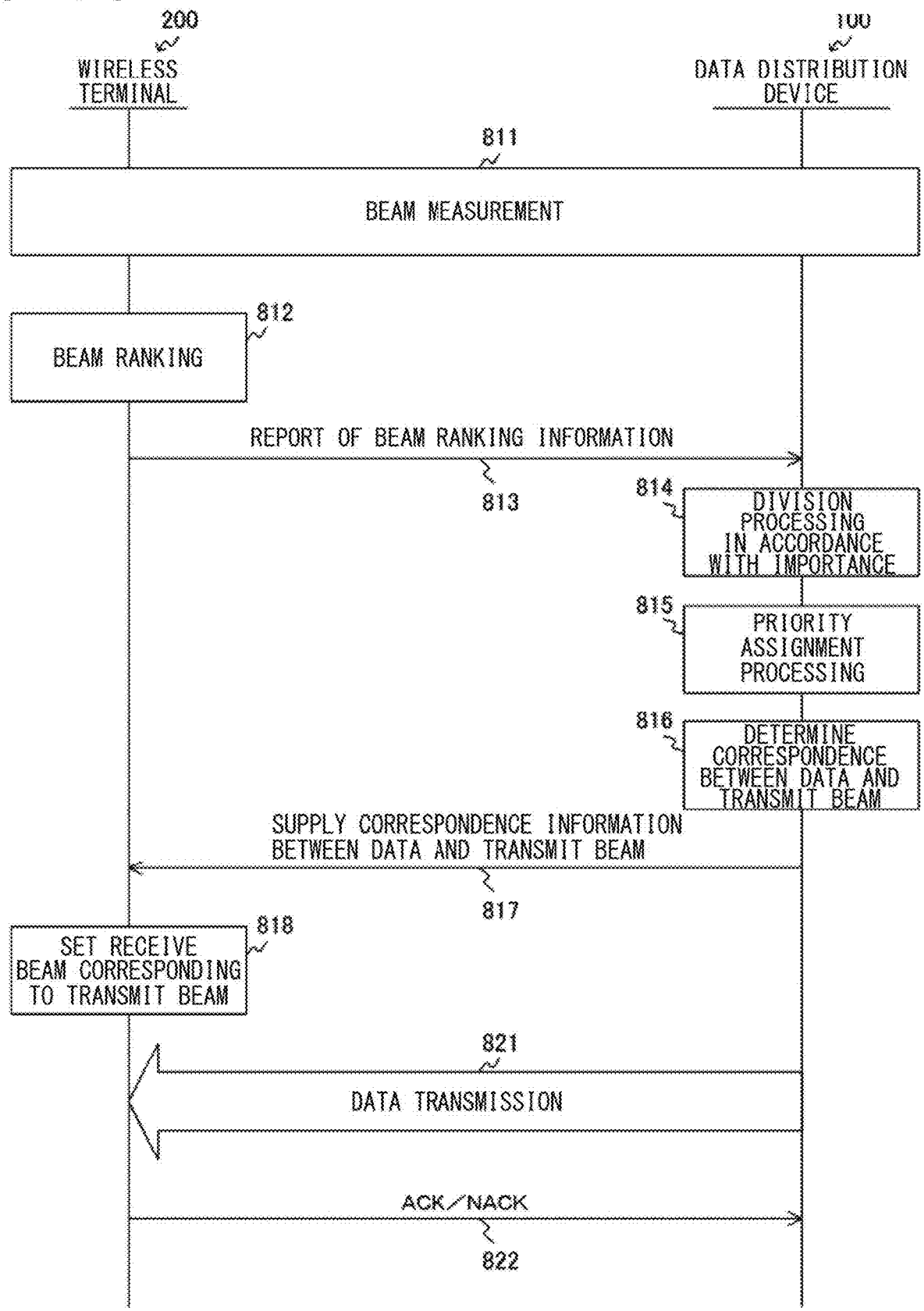
[FIG. 20]

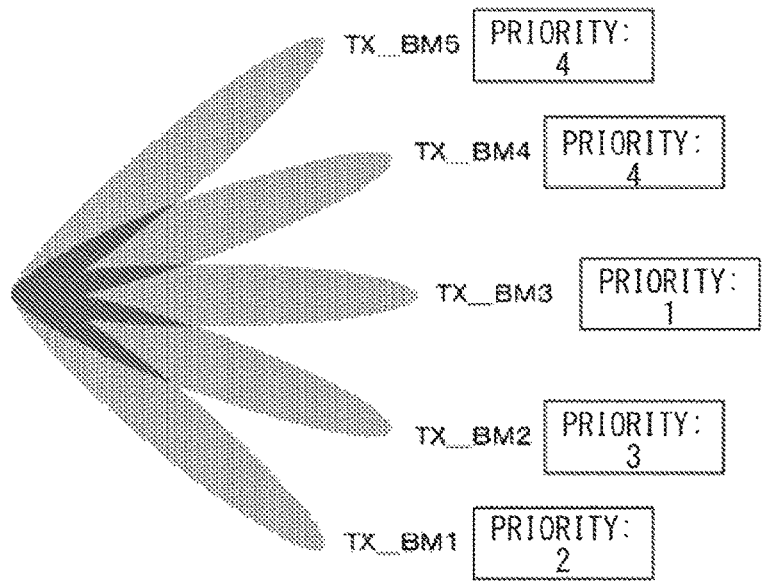
[FIG. 21A]
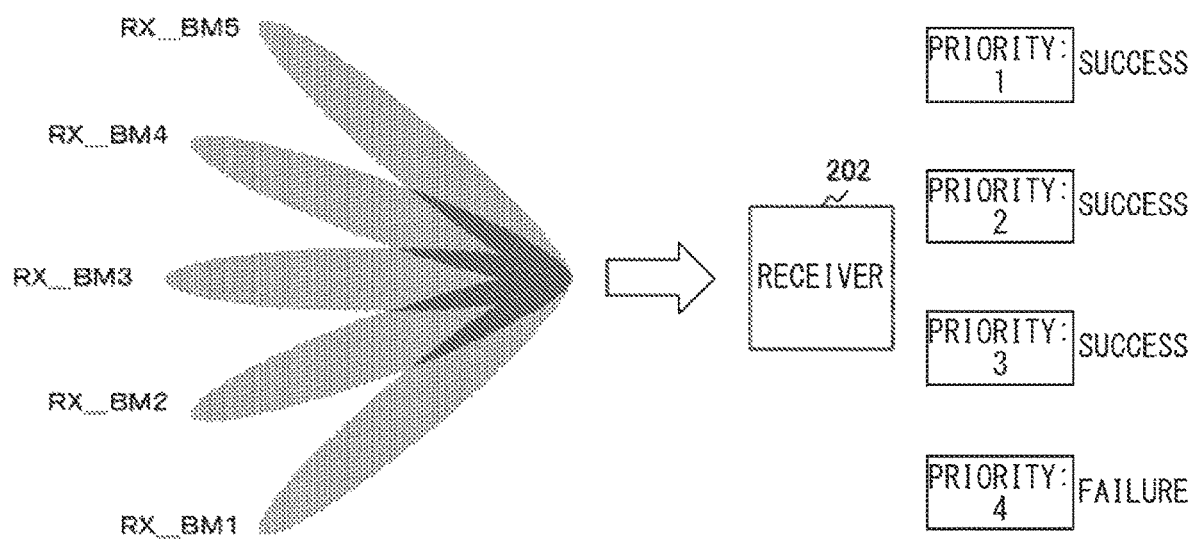
[FIG. 21B]

[FIG. 22]
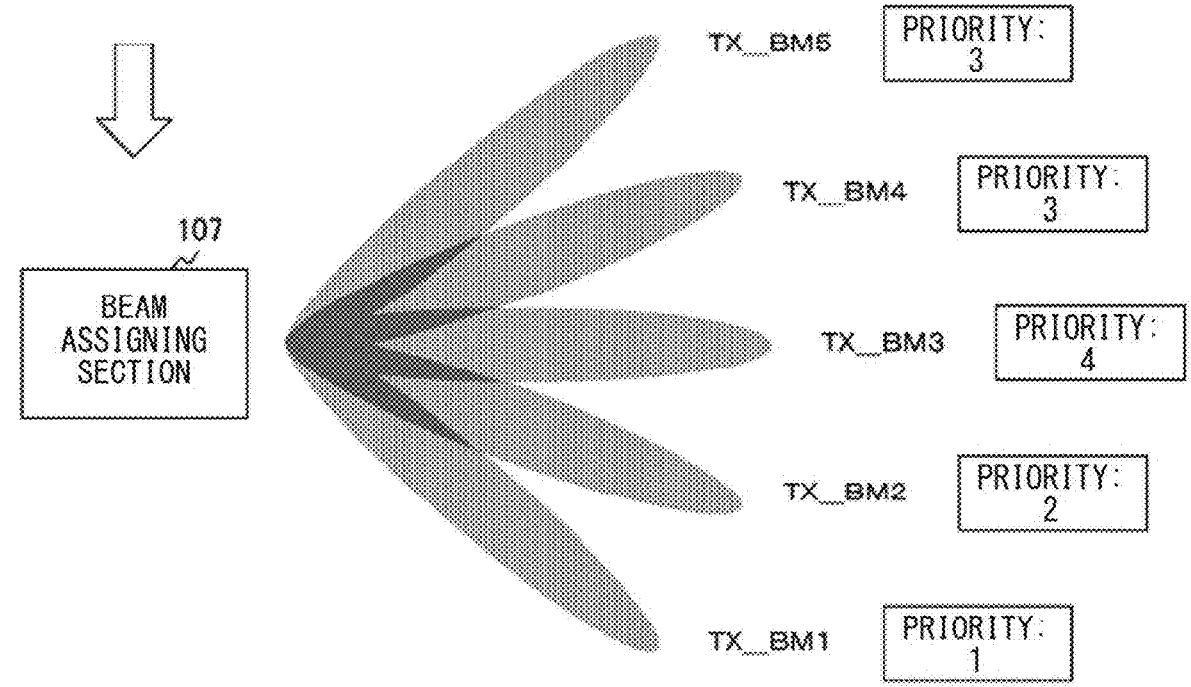

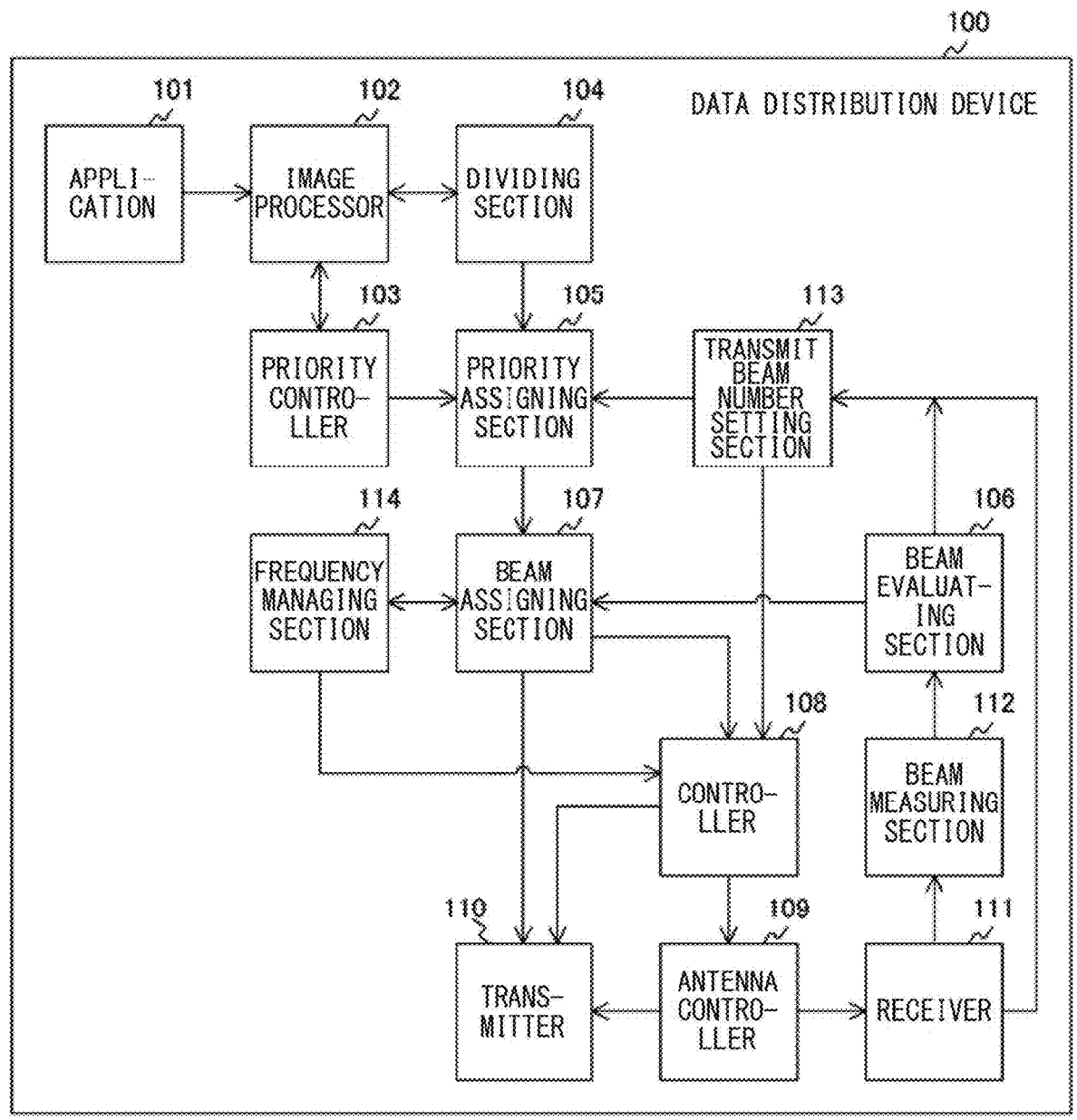
[FIG. 23]

[ FIG. 24 ]
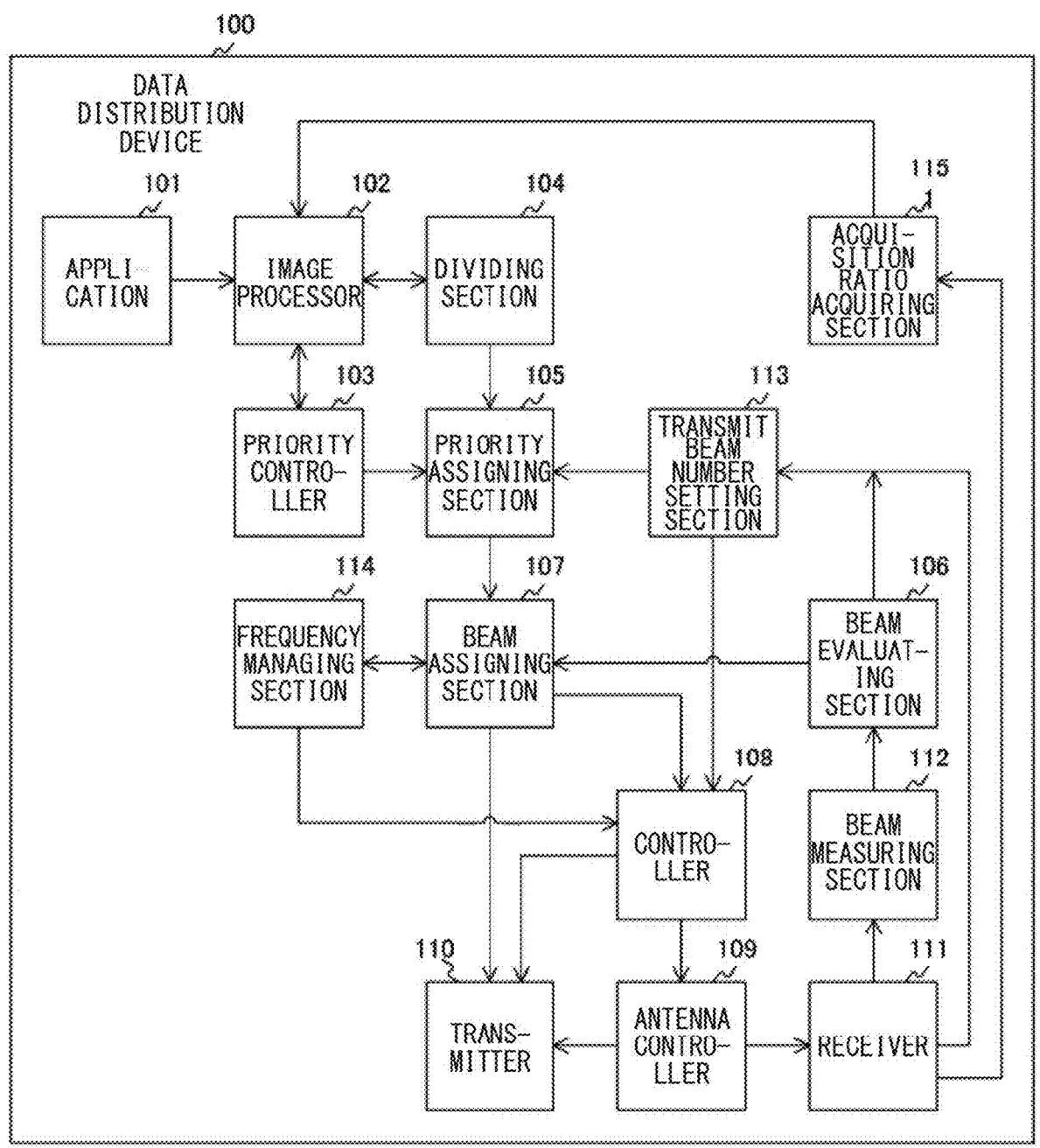

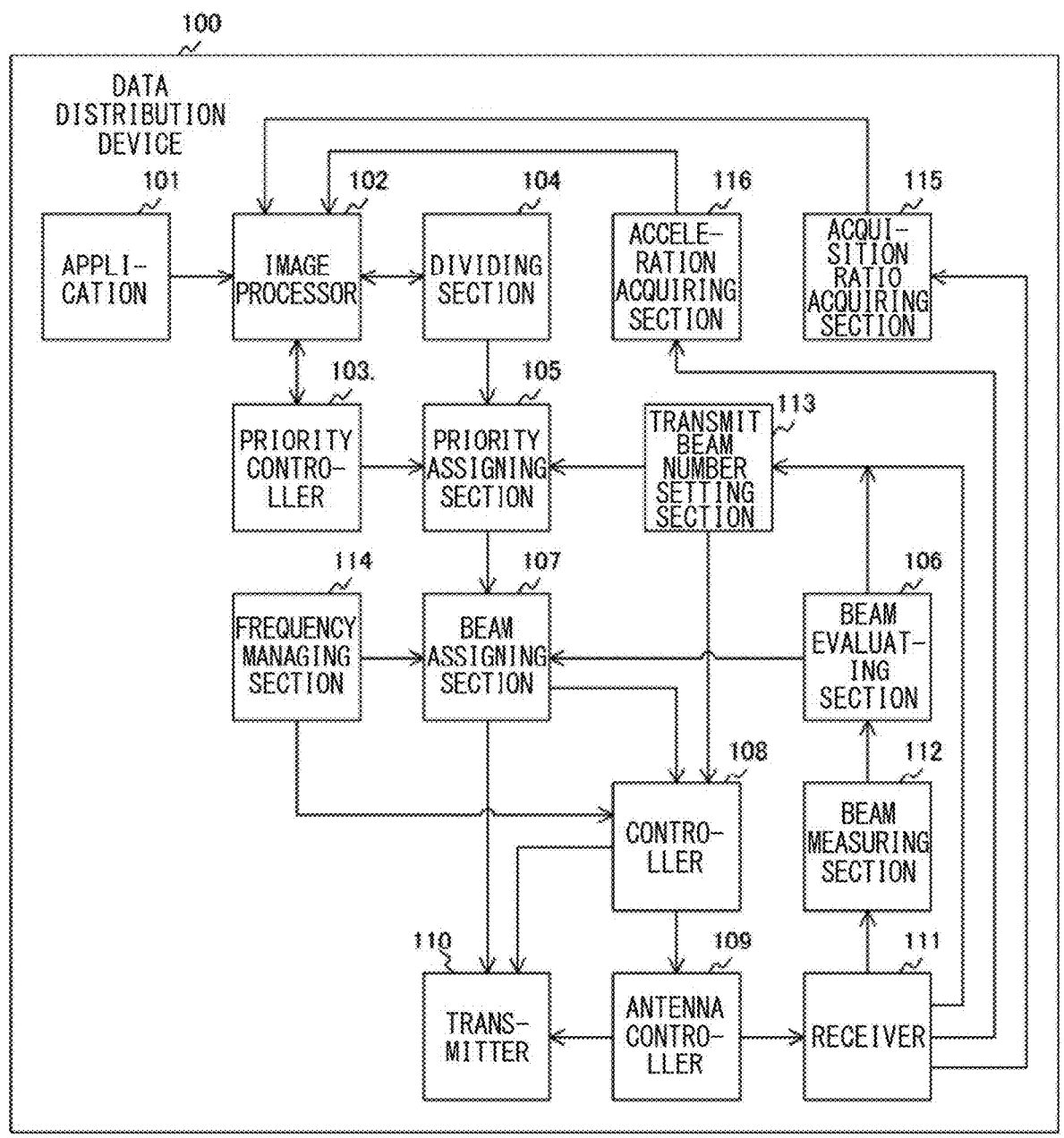
[ FIG. 25 ]

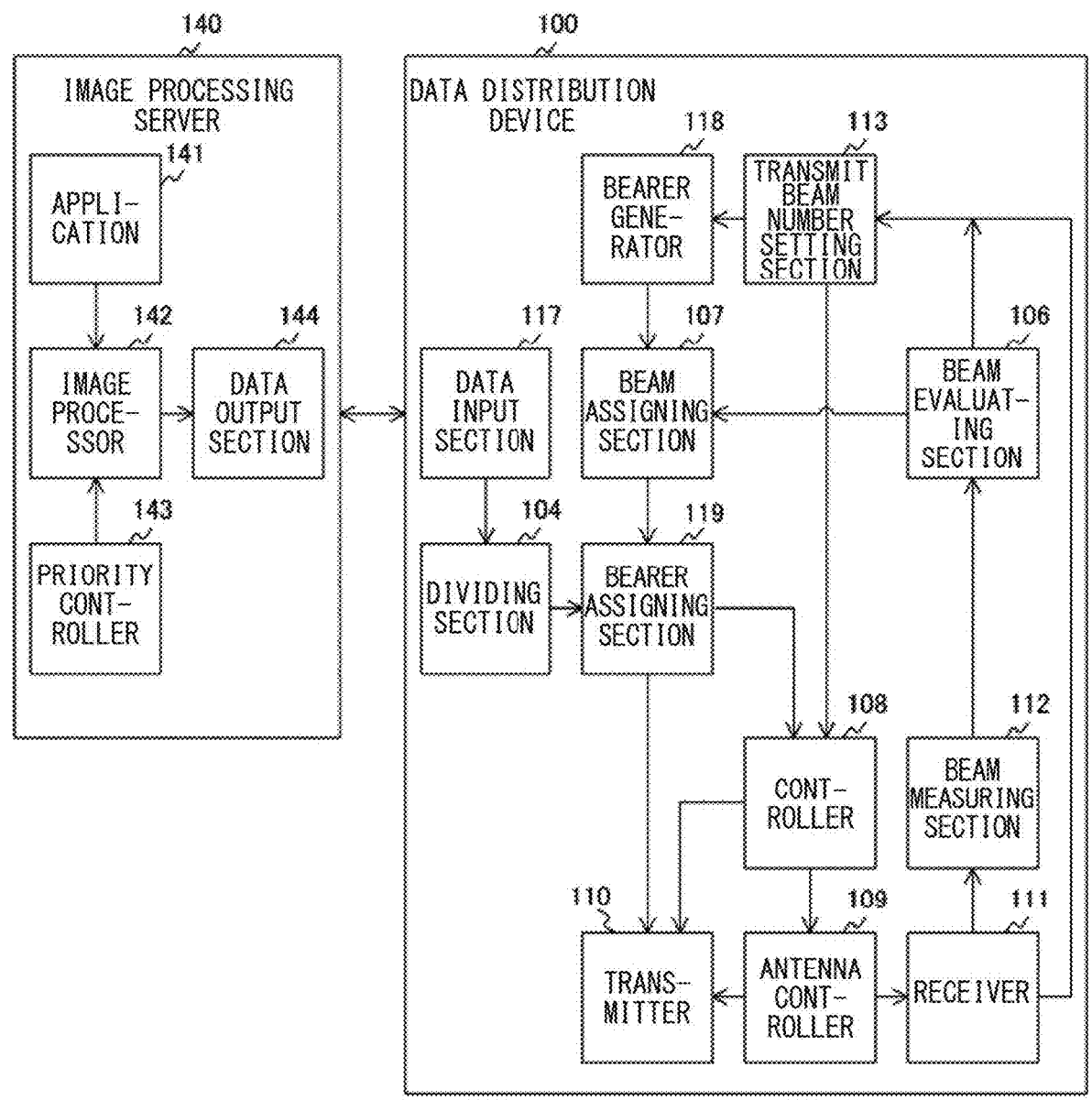
[ FIG. 26 ]

[FIG. 27]
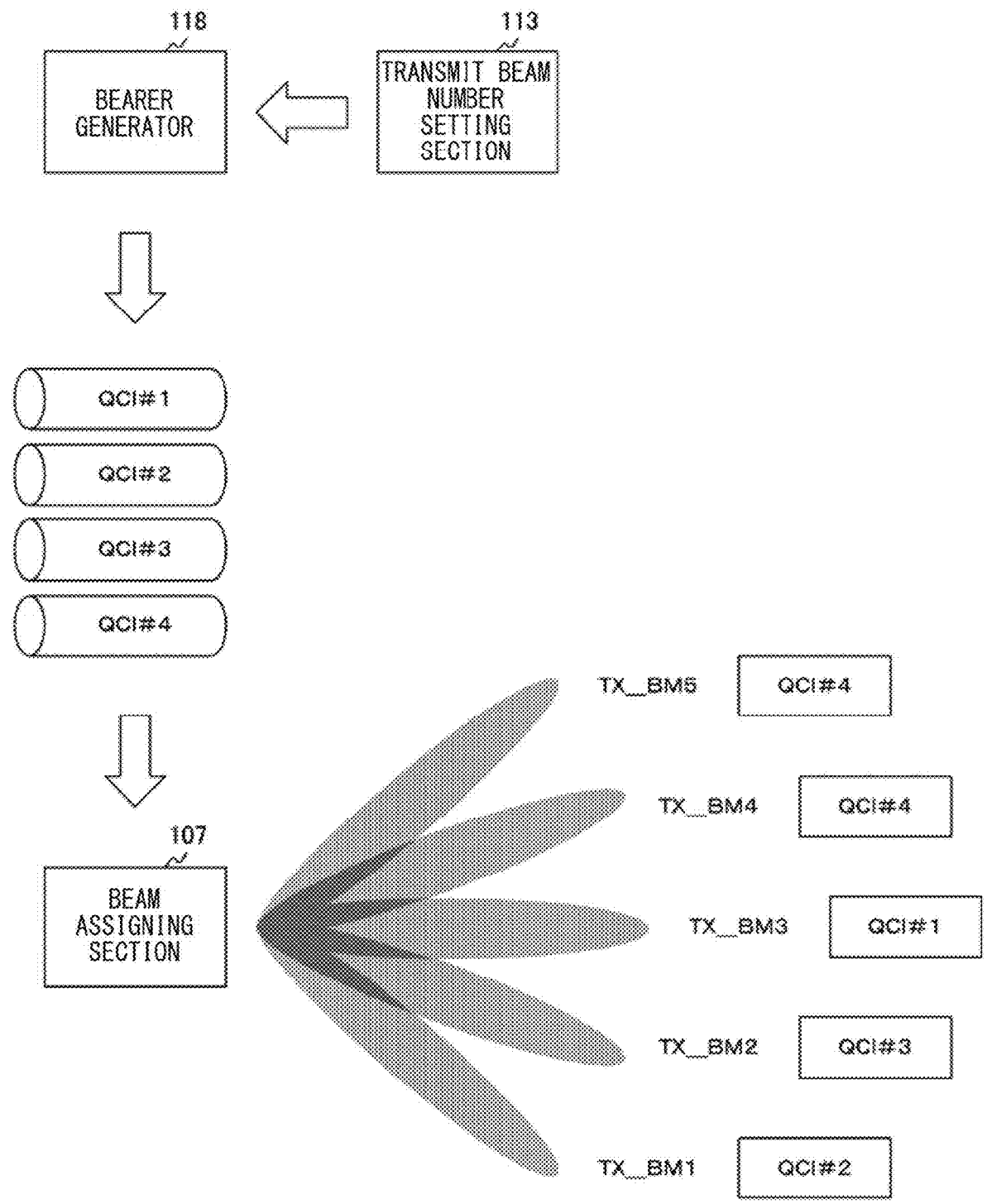

[ FIG. 28 ]
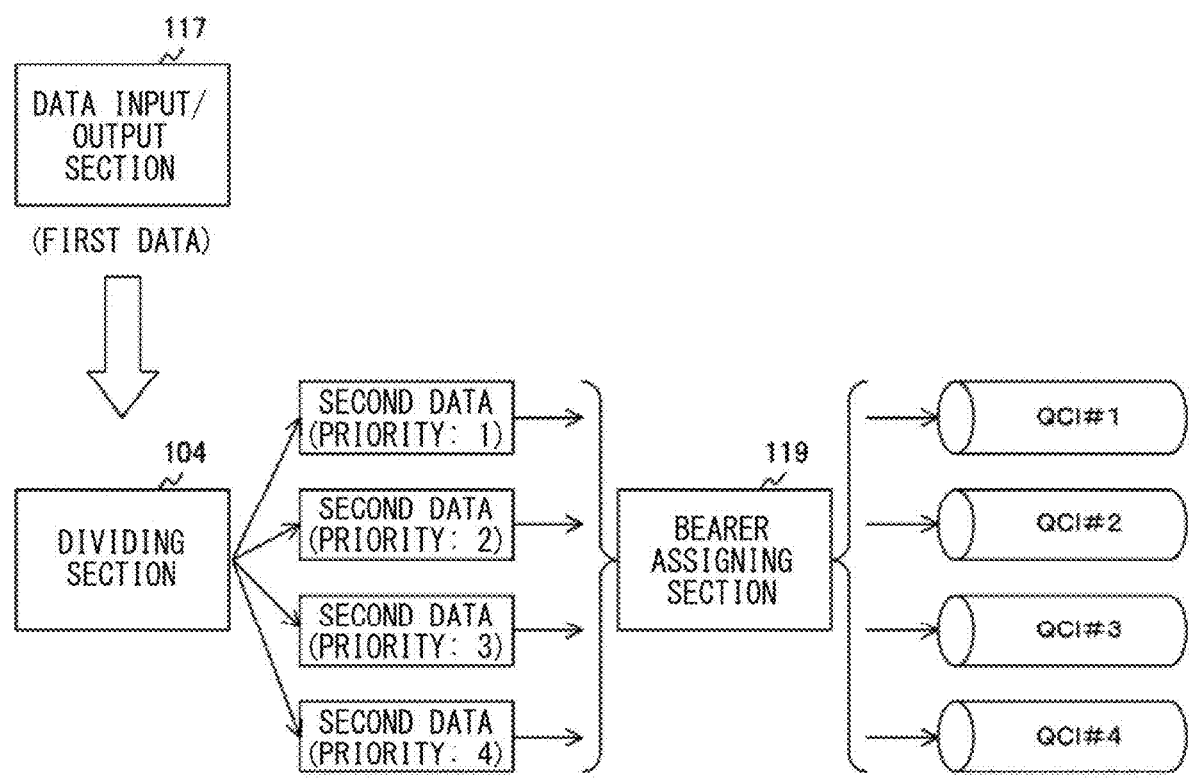

WIRELESS COMMUNICATION DEVICE

CROSS REFERENCE TO RELATED APPLICATIONS

This application is a U.S. National Phase of International Patent Application No. PCT/JP2020/027315 filed on Jul. 14, 2020, which claims priority benefit of Japanese Patent Application No. JP 2019-189878 filed in the Japan Patent Office on Oct. 17, 2019. Each of the above-referenced applications is hereby incorporated herein by reference in its entirety.

TECHNICAL FIELD

The present technology relates to a wireless communication device. More specifically, the present technology relates to a wireless communication device that performs transmission and reception with multi-beam with use of a plurality of antennas.

BACKGROUND ART

In recent years, 5G, which is a next-generation mobile wireless communication system, has attracted attention because of its characteristics such as ultra-high speed, low latency, high reliability, and multiple simultaneous connections. One characteristic of 5G is to use millimeter waves using a broad frequency band in order to achieve ultra-high speed. Wavelengths of the millimeter waves are short, which makes it possible to downsize an antenna element, and a 5G base station is expected to be equipped with a massive array antenna (massive array antenna). Meanwhile, the millimeter waves have great propagation loss, which causes concerns that coverage of millimeter waves is narrower, as compared with a 2-GHz band mainly used in 4G. Therefore, efforts are being made to use millimeter waves by using a technique of beamforming to compensate for a disadvantage of great propagation loss of the millimeter waves (see PTL 1, for example).

CITATION LIST

Patent Literature

PTL 1: International Publication No. WO2008/090836

SUMMARY OF THE INVENTION

Problem to be Solved by the Invention 5G has characteristics of ultra-high speed, low latency, high reliability, and multiple simultaneous connections; therefore, transmission of 4K and 8K moving images is expected. Furthermore, wearable devices are expected to become widespread as post-smartphones. Among use cases of wearable devices, there are use cases that need consideration not only of the aspect of ultra-high speed but also of the aspect of low latency and high reliability, and a technique of improving capacity and reducing an enormous amount of data to be transmitted as much as possible is desired in a trade-off relationship therebetween.

The present technology has been made in view of such circumstances, and an object of the present technology is to properly transmit a plurality of pieces of data with use of a plurality of beams.

Means for Solving the Problem

The present technology has been made to solve issues described above, and according to a first aspect of the present technology, a wireless communication device includes: a dividing section that divides first data generated in an application into a plurality of pieces of second data; a priority assigning section that assigns a priority to each of the above-described plurality of pieces of second data divided; a transmitter that transmits the above-described plurality of pieces of second data by wireless communication with use of a plurality of antenna elements; an antenna controller that sets a plurality of beams in a same first time interval or in different first time intervals upon transmission of the plurality of pieces of second data by the above-described transmitter; a beam quality acquiring section that acquires quality of each of the above-described plurality of beams; a beam evaluating section that performs evaluation of the above-described plurality of beams on the basis of quality of each of the above-described beams; a beam assigning section that determines a correspondence between the above-described plurality of beams and the above-described plurality of pieces of second data on the basis of the above-described evaluation and the above-described priority; and a controller that controls the above-described transmitter to transmit the above-described plurality of pieces of second data through the above-described corresponding plurality of beams. This brings an action of determining a correspondence between the pieces of second data and the beams on the basis of priorities of the plurality of pieces of second data acquired by dividing the first data and evaluation of quality of the plurality of beams, and transmitting the pieces of second data.

In addition, according to the first aspect, the above-described controller may perform control to transmit the above-described plurality of pieces of second data through the above-described corresponding plurality of beams in the above-described same first time interval by spatial multiplexing.

In addition, according to the first aspect, the above-described antenna controller may set each of the above-described plurality of beams in the above-described different first time intervals, and the above-described beam quality acquiring section may acquire quality of each of the above-described plurality of beams set in the above-described different first time intervals.

In addition, according to the first aspect, the above-described beam assigning section may further select beams having quality higher than a threshold from the above-described plurality of beams on the basis of the above-described threshold, may determine, for a plurality of pieces of third data equal in number to the above-described selected beams among the above-described plurality of pieces of second data, a correspondence between each of the above-described selected beams and each of priorities of the above-described plurality of pieces of third data on the basis of the evaluation, and may determine a correspondence between a plurality of unselected beams and any one piece of fourth data among the above-described plurality of pieces of second data, and the above-described controller may perform control to transmit the above-described plurality of third data in the above-described same first time interval through each of the above-described corresponding beams by spatial multiplexing, and may perform control to transmit the above-described one piece of fourth data in the above-described same first time interval through the above-described corresponding plurality of beams.

In addition, according to the first aspect, the above-described transmitter may transmit, to another wireless communication device, at least one of information relating to the above-described plurality of beams corresponding to the above-described plurality of pieces of third data, or information relating to the above-described plurality of beams corresponding to the above-described one piece of fourth data.

In addition, according to the first aspect, a receiver may be further included that receives, from another wireless communication device, a retransmission request signal for requesting retransmission of specific data among the above-described plurality of pieces of second data transmitted to the above-described other wireless communication device by the above-described transmitter, and the above-described beam assigning section may determine a correspondence between the above-described specific data and a beam having highest quality on the basis of the above-described evaluation.

In addition, according to the first aspect, a frequency managing section may be further included that manages use frequency bands while classifying the use frequency bands into at least a licensed band and an unlicensed band, and the above-described beam evaluating section may perform evaluation of the above-described plurality of beams for each of the above-described licensed band and the unlicensed band, and the above-described beam assigning section may determine a correspondence between at least data having lowest priority among the above-described plurality of pieces of second data and any given beam set in the above-described unlicensed band, on the basis of the evaluation.

In addition, according to the first aspect, a receiver may be further included that receives, from another wireless communication device, a retransmission request signal for requesting retransmission of specific data transmitted with use of the above-described unlicensed band among the above-described plurality of pieces of second data transmitted to the above-described other wireless communication device by the above-described transmitter, and the above-described beam assigning section may determine a correspondence with any given beam set in the licensed band on the basis of management by the above-described frequency managing section.

In addition, according to the first aspect, a receiver and an image processor may be further included. The receiver that receives, from another wireless communication device, a signal including information relating to an acquisition ratio of a data amount that has actually been acquired to a total amount of the above-described first data that is supposed to be acquired in a second time interval that is dynamically settable, and the image processor processes image information to be displayed by the above-described other wireless communication device, and changes resolution of at least data having lowest priority among the above-described plurality of pieces of second data on the basis of the information relating to the above-described acquisition ratio. In addition, in this case, the above-described second time interval may be an inverse of a frame rate of a moving image.

In addition, according to the first aspect, a receiver and an image processor may be further included. The receiver receives, from another wireless communication device, a signal including information relating to an acceleration sensor mounted on the above-described other wireless communication device, and the image processor processes image information to be displayed by the above-described other wireless communication device, and changes resolution of data having a priority other than data having highest priority among the above-described plurality of pieces of second data on the basis of the information relating to the above-described acceleration sensor.

In addition, according to the first aspect, the above-described first time interval may be a time in units of subframes or slots of a wireless frame in the above-described wireless communication.

In addition, according to the first aspect, the above-described antenna controller may perform control to dispose the above-described plurality of antenna elements on one antenna panel, divide the above-described plurality of antenna elements into two or more groups, and cause antenna elements included in each of the divided groups to generate one beam among the above-described plurality of beams.

In addition, according to the first aspect, the above-described plurality of antenna elements may be divided into and disposed on a plurality of antenna panels, and the above-described antenna controller may perform control to divide a plurality of antenna elements separately disposed on the above-described plurality of antenna panels into two or more groups, and cause the antenna elements included in each of the divided groups to generate one beam among the above-described plurality of beams.

In addition, according to the first aspect, the above-described application may initiate construction of a plurality of dedicated bearers corresponding to priorities assigned to the above-described plurality of pieces of second data divided. In addition, in this case, the above-described beam assigning section may determine a correspondence between each of the above-described plurality of beams and each of the above-described plurality of dedicated bearers.

In addition, according to a second aspect of the present technology, a wireless communication device includes: an antenna section including a plurality of antenna elements; a transmitter-receiver that receives a signal and data from another wireless communication device and transmits a signal to the above-described other wireless communication device; a measuring section that measures a plurality of first beams transmitted from the above-described other wireless communication device; an identifying section that identifies the above-described first beams on the basis of identification information of the above-described first beam acquired through the above-described signal received from the above-described other wireless communication device; an antenna controller that sets a plurality of second beams with respect to the above-described plurality of antenna elements; a specifying section that specifies setting of the above-described second beams that maximizes reception quality of each of the above-described plurality of first beams measured by the above-described measuring section; a beam quality information generator that generates beam quality information relating to a correspondence between the above-described identification information of the first beam and reception quality measured by setting of the above-described second beams specified by the above-described specifying section for each identification information of the first beam, and causes the above-described transmitter-receiver to transmit the beam quality information; a spatial demultiplexing section that separates spatially multiplexed data on the basis of information relating to a first combination including identification information of a plurality of first beams with which spatially multiplexed data is transmitted among the above-described plurality of first beams; and a combining section that combines same data transmitted with use of a plurality of first beams by diversity on the basis of information relating to a second combination including identification information of a plurality of first beams with which the above-described same data is transmitted by diversity.

In addition, according to the second aspect, data to be received from the above-described other wireless communication device may include image information to be updated at each dynamically settable time interval, a signal to be received from the above-described other wireless communication device may include information relating to a format of the above-described image information, and the wireless communication device may further include an image processor that arranges each first data separated by the above-described spatial demultiplexing section in the above-described time interval and second data combined by the above-described combining section on the basis of the format of the above-described image information.

In addition, according to the second aspect, a calculating section may be further included that calculates an acquisition ratio of a data amount that has actually been acquired to a total amount of data that is supposed to be acquired by the above-described image processor in the above-described time interval, and the above-described transmitter-receiver may transmit a signal including the above-described acquisition ratio to the above-described other wireless communication device.

In addition, according to the second aspect, a frequency managing section may be further included that manages use frequency bands while classifying the use frequency bands into at least a licensed band and an unlicensed band, and the above-described transmitter-receiver may receive a signal including a threshold relating to a dynamically settable acquisition ratio from the above-described other wireless communication device, and may transmit a signal including a request for adding a frequency band belonging to the above-described unlicensed band to the above-described other wireless communication device in a case where the above-described acquisition ratio exceeds the threshold relating to the above-described acquisition ratio.

BRIEF DESCRIPTION OF THE DRAWINGS

FIG. 1 is a diagram illustrating an example of an overall configuration of a wireless communication system according to an embodiment of the present technology.

FIG. 2 is a diagram illustrating an example of a multi-beam transmission method in the wireless communication system according to the embodiment of the present technology.

FIG. 3 is a diagram illustrating an example of wireless communication processing in the wireless communication system according to the embodiment of the present technology.

FIG. 4 is a diagram illustrating a configuration example of a data distribution device 100 according to a first embodiment of the present technology.

FIG. 5 is a diagram illustrating an example of image processing in an image processor 102 according to the embodiment of the present technology.

FIG. 6 is a diagram illustrating an example of division processing in a dividing section 104 according to the embodiment of the present technology.

FIG. 7 is a diagram illustrating an example of priority assignment processing in a priority assigning section 105 according to the embodiment of the present technology.

FIG. 8 is a diagram illustrating an example of beam evaluation processing in a beam evaluating section 106 according to the embodiment of the present technology.

FIG. 9 is a diagram illustrating an example of beam assignment processing in a beam assigning section 107 according to the embodiment of the present technology.

FIG. 10 is a diagram illustrating an example of transmission control processing in a controller 108 and an antenna controller 109 according to the embodiment of the present technology.

FIGS. 11A and 11B are diagrams illustrating an example of beam measurement according to the embodiment of the present technology.

FIG. 12 is a diagram illustrating an example of a beam measurement result according to the embodiment of the present technology.

FIG. 13 is a diagram illustrating an example of beam evaluation according to the embodiment of the present technology.

FIG. 14 is a diagram illustrating an example of a threshold of spatial multiplexing method control according to the embodiment of the present technology.

FIG. 15 is a diagram illustrating an example of spatial multiplexing method control according to the embodiment of the present technology.

FIG. 16 is a diagram illustrating an example of antenna control according to the embodiment of the present technology.

FIG. 17 is a diagram illustrating an example of antenna control for multi-beam transmission using a plurality of antenna panels according to the embodiment of the present technology.

FIG. 18 is a diagram illustrating a configuration example of a wireless terminal 200 according to the embodiment of the present technology.

FIG. 19 is a diagram illustrating an example of reception processing according to the embodiment of the present technology.

FIG. 20 is a sequence diagram illustrating an operation example of the wireless communication system according to the embodiment of the present technology.

FIGS. 21A and 21B are diagrams illustrating an example of occurrence of missing in the wireless communication system according to the embodiment of the present technology.

MODES FOR CARRYING OUT THE INVENTION

Modes for carrying out the technology (hereinafter referred to as "embodiments") are described below. Description is given in the following order.
1. First Embodiment (An example of assigning a beam in accordance with a priority of data)
2. Second Embodiment (An example of managing a use frequency band)
3. Third Embodiment (An example of changing resolution in accordance with an acquisition ratio)
4. Fourth Embodiment (An example of changing resolution in accordance with acceleration)
5. Fifth Embodiment (An example of adding a QCI of a radio bearer)

First Embodiment

[Wireless Communication System]

FIG. 1 is a diagram illustrating an example of an overall configuration of a wireless communication system according to an embodiment of the present technology.

This wireless communication system includes a data distribution device 100 and a wireless terminal 200. The data distribution device 100 is a device that distributes data to the wireless terminal 200. The wireless terminal 200 is a device (UE: User Equipment) that receives data distributed from the data distribution device 100. The data distribution device 100 includes a plurality of antennas, and transmits data with use of a plurality of transmit beams. The wireless terminal 200 includes a plurality of antennas, and receives data with use of a plurality of receive beams. Here, the data distribution device 100 may have, for example, a function of a base station called eNB (evolved NodeB) in LTE or gNB in NR (New Radio), which is a fifth-generation (5G) wireless access technology. In addition, the wireless terminal 200 transmits, to the data distribution device 100, a control signal for controlling data to be distributed, and the data distribution device 100 performs processing treatment on the data to be distributed, on the basis of the received control signal. Here, transmission and reception of the control signal may be performed using beams by FDD (Frequency Division Duplex) or TDD (Time Division Duplex) with use of the same frequency band (e.g., a 28-GHz band) as a frequency band in which the data to be distributed is transmitted and received, or may be performed by directivity of an omnidirectional antenna with use of a frequency band called sub-6 GHz, which is equal to or lower than a 6-GHz band.

FIG. 2 is a diagram illustrating an example of a multi-beam transmission method in the wireless communication system according to the embodiment of the present technology.

With millimeter waves, an antenna element is downsized; therefore, use of beamforming achieved by a plurality of antennas is expected. Reception of a large number of reflected waves particularly indoors is expectable because of characteristics of high straight forwardness of the millimeter waves, as illustrated in the drawing. That is, it is important how to effectively use the reflected waves.

This example illustrates an example in which data about game, e.g., data of moving images is distributed from the data distribution device 100 to the wireless terminal 200.

FIG. 3 is a diagram illustrating an example of wireless communication processing in the wireless communication system according to the embodiment of the present technology.

Here, a plurality of pieces of information is assumed, and it is assumed that different degrees of importance are set to the respective pieces of information. In this case, a control policy of what processing is to be applied is set in advance in accordance with importance. For example, this control policy is a control policy that priorities are increased in accordance with degrees of importance.

Accordingly, in the following embodiments, a priority is given in accordance with importance of information, and beam assignment is performed in accordance with the priority of information.

[Data Distribution Device]

FIG. 4 is a diagram illustrating a configuration example of the data distribution device 100 according to a first embodiment of the present technology.

The data distribution device 100 includes an application 101, an image processor 102, a priority controller 103, a dividing section 104, a priority assigning section 105, a beam evaluating section 106, a beam assigning section 107, a controller 108, an antenna controller 109, a transmitter 110, a receiver 111, a beam measuring section 112, and a transmit beam number setting section 113.

The application 101 provides a service by various data such as sound and moving images. For example, the application 101 provides first data processed by the image processor 102 to the wireless terminal 200 through wireless communication. Here, the data distribution device 100 may be a base station device, an access point, or the like.

The image processor 102 processes image information to be provided to the wireless terminal 200. The image processor 102 divides an entire image region to be transmitted into regions in accordance with importance, and performs image processing to decrease resolution of a region having lower importance, thereby reducing an information amount. Here, importance of a region where the viewpoint of a user is concentrated is set high, and importance of a region where the viewpoint is not so concentrated is set low. For example, the position of the viewpoint is detected by a sensor, and the entire image region is divided into regions in accordance with an existence probability distribution of the viewpoint in the entire image region. It is to be noted that division based on importance of regions may be dynamically changed. FIG. 5 is a diagram illustrating an example of image processing in the image processor 102 according to the embodiment of the present technology. The priority controller 103 assigns a priority to data included in image information for each region in accordance with degrees of importance.

The dividing section 104 divides first data processed by the image processor 102 on the basis of priorities indicated by the priority controller 103. FIG. 6 is a diagram illustrating an example of division processing in the dividing section 104 according to the embodiment of the present technology.

The priority assigning section 105 assigns a priority to each of a plurality of pieces of second data divided by the dividing section 104. FIG. 7 is a diagram illustrating an example of priority assignment processing in the priority assigning section 105 according to the embodiment of the present technology. Here, the second data may include data of granularity called a flow (Flow), and the priority assigning section 105 assigns, for example, a 5QI (5G QoS Identifier) to each flow. The flow to which the 5QI is assigned is referred to as a QoS flow (QoS Flow).

The beam evaluating section 106 evaluates each of a plurality of beams on the basis of quality. FIG. 8 is a diagram illustrating an example of beam evaluation processing in the beam evaluating section 106 according to the embodiment of the present technology. Beam evaluation is described in detail later. Here, the concept of beams may further include the concept of polarized waves in addition to the concept of directivity. That is, among beams having the same directivity, beams having different polarized waves and the same directivity are treated as different beams. Here, examples of the polarized waves include a vertically polarized wave and a horizontally polarized wave, or a right-handed circularly polarized wave and a left-handed circularly polarized wave.

The transmit beam number setting section 113 sets the number of beams upon multi-beam transmission on the basis of "information relating to the maximum number of beams simultaneously receivable by the wireless terminal 200" and quality of each beam by the beam measuring section 112. Here, the "information relating to the maximum number of beams simultaneously receivable by the wireless terminal 200" is acquirable from the wireless terminal 200 through the receiver 111. For example, in a case where "the maximum number of beams simultaneously receivable by the wireless terminal 200" is five, the number of beams is set to five or less.

The beam assigning section 107 determines assignment of each piece of second data to which a priority has been assigned to each beam in accordance with quality of beams. The beam assigning section 107 assigns data having a higher priority to a beam having higher quality. FIG. 9 is a diagram illustrating an example of beam assignment processing in the beam assigning section 107 according to the embodiment of the present technology. In addition, the beam assigning section 107 may determine a correspondence between quality of each beam upon multi-beam transmission and the 5QI assigned to each QoS flow. Here, a correspondence between quality of each beam and each 5QI may be a one-to-one or one-to-M (here, M is an integer of 2 or more) correspondence.

The controller 108 controls generation of transmit beams upon evaluation of beams by the beam evaluating section 106. Here, the controller 108 generates transmit beams upon evaluation of beams on the basis of the number of beams upon multi-beam transmission set by the transmit beam number setting section 113.

In addition, the controller 108 controls the transmitter 110 to transmit each piece of second data to which a priority has been assigned with a beam suitable for each priority. Here, the beam suitable for each priority is controlled by the antenna controller 109. The antenna controller 109 sets a plurality of beams in the same first time interval or in different first time intervals upon transmission of a plurality of pieces of second data by the transmitter. FIG. 10 is a diagram illustrating an example of transmission control processing in the controller 108 and the antenna controller 109 according to the embodiment of the present technology.

The transmitter 110 transmits a plurality of pieces of second data to the wireless terminal 200 with a plurality of beams. The receiver 111 receives information such as a response from the wireless terminal 200.

The beam measuring section 112 measures quality of beams used for wireless communication with the wireless terminal 200. Measurement and evaluation of the beams are described below.

[Measurement and Evaluation of Beams]

FIGS. 11A and 11B are diagrams illustrating an example of beam measurement according to the embodiment of the present technology.

The antenna controller 109 generates a plurality of beams, e.g., transmit beams TX_BM1 to TX_BM5. Here, the data distribution device 100 notifies the wireless terminal 200 that respective beams of a transmitting antenna are, for example, beams having different beam IDs (Beam IDs) depending on a difference in a demodulation reference signal DMRS (DeModulation Reference Signal) to be transmitted. The demodulation reference signal DMRS is, for example, a PBCH-DRMS used to demodulate a broadcast channel PBCH (Physical Broadcast Channel). In addition, each beam of the transmitting antenna may also transmit a beam specific reference signal (beam specific reference signal). Alternatively, a notification may be made that the beams are beams having different beam IDs (Beam IDs) depending on a difference in the pattern of a synchronization signal.

The wireless terminal 200 controls a receiving antenna to generate a plurality of beams, e.g., receive beams RX_BM1 to RX_BM5, and to receive a synchronization signal to be transmitted with each beam of the transmitting antenna while ensuring synchronization with the synchronization signal for each beam of the receiving antenna. The wireless terminal 200 measures received electric power of the synchronization signal as RSRP (Reference Signal Received Power). It is to be noted that in a case where each beam of the transmitting antenna transmits the beam specific reference signal, received electric power of the reference signal may be measured as RSRP. In addition, the received electric power may also be measured as RSRQ (Reference Signal Received Quality) or a SINR (Signal to Interference plus Noise power Ratio).

Here, the antenna controller 109 simultaneously generates a plurality of transmit beams TX_BM1 to TX_BM5 within the same time, while the wireless terminal 200 simultaneously generates a plurality of receive beams RX_BM1 to RX_BM5 to measure received electric power for each beam.

In addition, the antenna controller 109 may also set, or sweep, each of the plurality of transmit beams TX_BM1 to TX_BM5 in each different time, while the wireless terminal 200 may simultaneously generate the plurality of receive beams RX_BM1 to RX_BM5 and measure received electric power for each beam in a time in which each transmit beam is set.

Furthermore, the antenna controller 109 may set, or sweep, each of the plurality of transmit beams TX_BM1 to TX_BM5 in each different time, while the wireless terminal 200 may set, or sweep, each of the plurality of receive beams RX_BM1 to RX_BM5 in a time division manner and measure received electric power for each beam in a time in which each transmit beam is set.

That is, the plurality of transmit beams and the plurality of receive beams may simultaneously set a plurality of beams in the same first time interval, or may set a plurality of beams in different first time intervals by sweeping. It is to be noted that the first time interval is assumed to be, for example, a time in units of subframes or slots acquired by further dividing a wireless frame in the wireless communication.

FIG. 12 is a diagram illustrating an example of a beam measurement result according to the embodiment of the present technology.

This example illustrates result data of RSRP of the beams TX_BM1 to TX_BM5 of the transmitting antenna measured by the beams RX_BM1 to RX_BM5 of the receiving antenna.

FIG. 13 is a diagram illustrating an example of beam evaluation according to the embodiment of the present technology.

This example is ranking of beams ranked (ranked) on the basis of measured RSRP of the beams. For example, the highest ranked beam of the transmitting antenna is TX_BM3, and a beam of the receiving antenna corresponding to TX_BM3 is RX_BM3. The next highest ranked beam of the transmitting antenna is TX_BM1, and a beam of the receiving antenna corresponding to TX_BM1 is RX_BM1.

Here, the beam assigning section 107 determines assignment of each piece of second data to which a priority has been assigned to each beam in accordance with quality of beams, that is, beam ranks, as described above. For example, a piece of second data to which the highest priority has been assigned is assigned to TX_BM3 having the highest beam rank, and a piece of second data to which the next highest priority has been assigned is assigned to TX_BM1 having the next highest beam rank after TX_BM3.

Here, in a case where a communication system is FDD (Frequency Division Duplex), beam measurement is performed on side of the wireless terminal 200, and ranking in the drawing is performed. Then, the wireless terminal 200 provides information relating to beam ranks to the data distribution device 100.

In addition, a beam measurement result may be provided to the data distribution device 100 through a measurement report (measurement report). The beam measuring section 112 may acquire the measurement report, and the beam evaluating section 106 may perform ranking as illustrated in the drawing.

In addition, in a case where the communication system is TDD (Time Division Duplex), beam measurement is performed on side of the data distribution device 100. The receiver 111 of the data distribution device 100 receives a plurality of transmit beams generated by the wireless terminal 200 through a plurality of receive beams. The beam evaluating section 106 performs ranking as illustrated in the drawing on the basis of a measurement result of each beam. Here, the beam evaluating section 106 generates information (beam corresponding information) relating to a correspondence between the transmit beams generated by the wireless terminal 200 and the receive beams generated by the data distribution device 100, and provides the information to the wireless terminal 200 through the transmitter 110. The wireless terminal 200 uses the beam corresponding information to set each receive beam corresponding to each transmit beam of the data distribution device 100, and receives data from the data distribution device 100 through a multi-beam.

[Spatial Multiplexing Method Control]

FIG. 14 is a diagram illustrating an example of a threshold of spatial multiplexing method control according to the embodiment of the present technology.

In a network, any given threshold is set for quality of beams. For a plurality of beams of the transmitting antenna that is able to acquire RSRP equal to or higher than the threshold, a plurality of pieces of second data is simultaneously transmitted with use of a plurality of beams in a spatial multiplexing method. In contrast, for a plurality of beams of the transmitting antenna that acquires only RSRP less than the threshold, control is performed to simultaneously transmit the same second data with use of a diversity method, that is, a plurality of beams.

For example, in an example illustrated in the drawing, three beams TX_BM3, TX_BM1, and TX_BM2, which each have a beam rank equal to or higher than the threshold, of the transmitting antenna are used to simultaneously transmit third data including three pieces of second data having priorities of 1, 2, and 3. In contrast, two beams TX_BM4 and TX_BM5, which each have a beam rank less than the threshold, of the transmission antenna are used to simultaneously transmit fourth data including one piece of second data having a priority of 4. FIG. 15 is a diagram illustrating an example of spatial multiplexing method control according to the embodiment of the present technology. Thus, spatial multiplexing method control in accordance with the beam ranks is performed.

[Antenna Control]

FIG. 16 is a diagram illustrating an example of antenna control according to the embodiment of the present technology.

The data distribution device 100 includes a plurality of antennas. In the plurality of antennas, for example, respective antenna groups (sets), such as BM #1 and BM #2 surrounded by dotted lines, including a plurality of antenna elements are set.

It is to be noted that in the drawing, two antenna groups are illustrated as an example; however, the antenna groups are set in accordance with the number of beams to be formed. That is, each of antenna groups (BM #1 and BM #2) forms one beam. In addition, the antenna group may be a unit of an antenna port (Antenna Port). Here, one antenna group includes antennas that transmit and receive the same polarized wave. It is to be noted that in a case where a circularly polarized wave is generated by a plurality of antennas, the plurality of antennas may be treated as one antenna element.

In a transmission operation, a plurality of antennas included in BM #1 forms the beam TX_BM1, and a plurality of antennas included in BM #2 forms the beam TX_BM2. Likewise, in a reception operation, the plurality of antennas included in BM #1 forms the beam RX_BM1, and the plurality of antennas included in BM #2 forms the beam RX_BM2.

It is to be noted that the antenna groups BM #1 and BM #2 may be set to be different between the transmission operation and the reception operation. In addition, the antenna groups BM #1 and BM #2 may be set in accordance with an operation frequency band.

FIG. 17 is a diagram illustrating an example of antenna control for multi-beam transmission using a plurality of antenna panels according to the embodiment of the present technology.

In a millimeter wave band having a short wavelength, downsizing of the antenna element is expectable. Accordingly, using beams generated by a plurality of antenna elements makes it possible to compensate for deterioration in propagation loss at a high frequency. Here, the plurality of antenna elements may be installed in one location, or may be separately installed in different locations. A unit of an antenna installed in a different location is defined as an antenna panel. Here, each of antenna panels 191 to 195 is able to independently generate and control a beam. In addition, for each of the antenna panels 191 to 195, setting a plurality of antenna panels 191 to 195 as illustrated in the drawing makes it possible to form a plurality of beams.

This example illustrates an example in which five antenna panels 191 to 195 are hung for one data distribution device 100; however, the number of antenna panels may be four or less, or may be six or more. The data distribution device 100 and each of hung antenna panels may be coupled to each other by an optical fiber.

As illustrated in the drawing, the antenna panels 191 to 195 are able to independently generate beams. For example, each of the antenna panels 191 to 195 is able to form one beam that is able to acquire the highest S/N ratio (Signal to Noise ratio) with respect to the wireless terminal 200. Accordingly, it is possible to form a multi-beam with use of the plurality of antenna panels 191 to 195 and perform multi-beam transmission. In this case, as compared with a case where a multi-beam is formed on one antenna panel, it is easy to secure a path that is more independent (has a higher S/N ratio) with respect to the wireless terminal 200 in terms of spatial multiplexing, which makes it possible to improve transmission capacity upon spatial multiplexing.

There are two major methods for control of the multi-beam with use of a plurality of antenna panels. One method is a method in which a plurality of antenna panels is equivalently considered as one antenna panel, a plurality of beams formed by the respective antenna panels is aggregated, and one equivalent antenna panel forms the number of aggregated beams. In this case, setting is performed to transmit different DMRSs, the beam specific reference signals, or synchronization signals having different patterns to assign different beam IDs to the respective aggregated beams. The other method is a method in which each antenna panel transmits information that identifies the antenna panel and identification of a plurality of beams is performed for each antenna panel. For example, each beam of the antenna panel transmits a synchronization signal having a pattern different for each antenna panel. Furthermore, each beam of the antenna panel transmits a DMRS different for each beam, or a beam specific reference signal.

[Wireless Terminal]

FIG. 18 is a diagram illustrating a configuration example of the wireless terminal 200 according to the embodiment of the present technology.

The wireless terminal 200 includes a controller 201, a receiver 202, an antenna controller 203, a transmitter 204, a spatial demultiplexing section 205, a diversity combining section 206, an image processor 207, and a display section 208. The controller 201 controls the wireless terminal 200. The controller 201 acquires "information relating to a correspondence between respective pieces of second data and transmit beams" from the data distribution device 100 through the receiver 202. In addition, the controller 201 transmits a response of ACK or NACK to the data distribution device 100 through the transmitter 204, depending on success or failure in reception of each piece of second data through the receiver 202. In addition, the controller 201 distributes a plurality of pieces of second data received by the receiver 202 through a multi-beam to the spatial demultiplexing section 205 or the diversity combining section 206 on the basis of the acquired "information relating to a correspondence between respective pieces of second data and transmit beams".

The antenna controller 203 generates a receive multi-beam corresponding to a beam rank of a transmit beam in the reception operation on the basis of the "information relating to a correspondence between respective pieces of second data and transmit beams" acquired by the controller 201.

The spatial demultiplexing section 205 separates a plurality of pieces of second data spatially multiplexed. The spatial demultiplexing section 205 performs demodulation processing based on precoding weight information in accordance with precoding performed by the transmitter 110 of the data distribution device 100, as necessary.

The diversity combining section 206 performs combination processing on pieces of second data transmitted by diversity transmission. Here, the combination processing is, for example, one of selection combining, equal-gain combining, or maximum-ratio combining.

The image processor 207 reconstitutes (duplicates), as image information, the plurality of pieces of second data processed by the spatial demultiplexing section 205 or the diversity combining section 206. That is, the image processor 207 arranges respective pieces of second data separated by the spatial demultiplexing section 205 and the pieces of second data combined by the diversity combining section 206 on the basis of a format of image information. Here, the image information is, for example, image data for each frame.

The display section 208 displays the image information processed by the image processor 207, e.g., image data for each frame.

The transmitter 204 transmits information such as a response to the data distribution device 100. The receiver 202 receives a plurality of pieces of second data with a plurality of beams from the data distribution device 100.

FIG. 19 is a diagram illustrating reception processing according to the embodiment of the present technology.

The data distribution device 100 spatially multiplexes and transmits respective pieces of second data having priorities of 1, 2, and 3 with use of the transmit beams TX_BM3, TX_BM1, and TX_BM2, and transmits a piece of second data having a priority of 4 by diversity transmission with use of transmit beams TX_BM4 and TX_BM5.

The wireless terminal 200 receives the respective pieces of second data that have been spatially multiplexed and have priorities of 1, 2, and 3 through the receive beams RX_BM3, RX_BM1, and RX_BM2 on the basis of the "information relating to a correspondence between respective pieces of second data and transmit beams" acquired from the data distribution device 100, and receives the piece of second data that has been transmitted by diversity transmission and has a priority of 4 through the receive beams RX_BM5 and RX_BM4.

[Operation]

FIG. 20 is a sequence diagram illustrating an operation example of the wireless communication system according to the embodiment of the present technology. This example illustrates a flow of processing of distributing data from the data distribution device 100 to the wireless terminal 200 through a multi-beam on the assumption that a communication system is FDD.

The wireless terminal 200 performs transmission and reception to and from the data distribution device 100 in accordance with a procedure described above to measure a beam (811). Then, the wireless terminal 200 evaluates the beam in accordance with a result of such measurement to perform ranking (812). The wireless terminal 200 reports information relating to beam ranking to the data distribution device 100 (813).

Here, the wireless terminal 200 provides the "information relating to the maximum number of beams simultaneously receivable" to the data distribution device 100. The "information relating to the maximum number of beams simultaneously receivable" may be provided, for example, as "UE Capability" to the data distribution device 100.

The data distribution device 100 determines the number of transmit beams upon multi-beam transmission on the basis of the "information relating to the maximum number of beams simultaneously receivable" notified from the wireless terminal 200. In the example described above, the "maximum number of beams simultaneously receivable" is five.

The dividing section 104 of the data distribution device 100 divides the first data in accordance with importance to form a plurality of pieces of second data (814).

The priority assigning section 105 assigns a priority to each of the pieces of second data divided by the dividing section 104 on the basis of importance (815).

The beam assigning section 107 determines a correspondence between the respective pieces of second data to which priorities are assigned and transmit beams on the basis of beam ranks and the "maximum number of beams simultaneously receivable" by the wireless terminal 200 (816).

The data distribution device 100 transmits the "information relating to a correspondence between respective pieces of second data and transmit beams" to the wireless terminal 200 (817).

The wireless terminal 200 sets receive beams corresponding to the transmit beams in order to receive the respective pieces of second data on the basis of the acquired "information relating to a correspondence between respective pieces of second data and transmit beams" (818).

The data distribution device 100 transmits the respective pieces of second data through corresponding transmit beams (821). The wireless terminal 200 transmits, as a response, ACK in a case where reception succeeds and NACK in a case where reception fails for each piece of second data to the data distribution device 100 (822).

Here, the wireless terminal 200 may report a result of beam measurement (811) to the data distribution device 100, and the data distribution device 100 may perform beam evaluation (812). In this case, the data distribution device 100 provides information relating to a correspondence between transmit beams and receive beams to the wireless terminal 200.

It is to be noted that in this example, FDD is assumed as the communication system; however, in a case of TDD, the data distribution device 100 may perform beam measurement (811) and beam evaluation (812) with use of reciprocity (reciprocity) between transmission and reception. In this case, the data distribution device 100 provides information relating to a correspondence between transmit beams and receive beams to the wireless terminal 200.

Here, information to be transmitted through a control plane (Control Plane), e.g., a report of beam ranking information (813), the "information relating to a correspondence between respective pieces of second data and transmit beams" (817), and ACK/NACK (822) may be transmitted through one transmit beam having a specific priority. At this time, the specific priority may be a priority corresponding to a default bearer (default bearer).

FIGS. 21A and 21B are diagrams illustrating an example of occurrence of missing in the wireless communication system according to the embodiment of the present technology.

The data distribution device 100 spatially multiplexes and transmits the pieces of second data having priorities 1, 2, and 3 with use of the beams TX_BM3, TX_BM1, and TX_BM2, and transmits one piece of second data having a priority of 4 by spatial diversity with use of two beams TX_BM4 and TX_BM5. Spatially multiplexed data is received on side of the wireless terminal 200 with use of the beams RX_BM3, RX_BM1, and RX_BM2, and separate reception of the pieces of second data that have been spatially multiplexed and have priorities of 1, 2, and 3 succeeds. In contrast, the piece of second data having a priority of 4 transmitted by spatial diversity is combined and received with use of the beams RX_BM5 and RX_BM4; however, in this example, it is assumed that missing occurs, resulting in a failure in reception.

FIG. 22 is a diagram illustrating an example of retransmission processing in the wireless communication system according to the embodiment of the present technology.

Upon retransmission of the piece of second data having a priority of 4 of which transmission has failed in the example described above, the beam assigning section 107 assigns the piece of second data having a priority of 4 as data having the highest priority to TX_BM3 having the highest beam rank in the next transmission timing period. Then, the beam assigning section 107 assigns, as data having the next highest priority, pieces of second data having priorities of 1 and 2 in a data group following a data group of which transmission has succeeded to the beams TX_BM1 and TX_BM2. The beam assigning section 107 assigns a piece of second data having a priority of 3 in the data group following the data group of which transmission has succeeded to two beams TX_BM4 and TX_BM5 for spatial diversity transmission.

Here, the beam assigning section 107 may perform control not to perform retransmission in accordance with the priority of data to be retransmitted. For example, in a case where the priority of data to be retransmitted is lower than a settable threshold, a request for retransmission may be ignored. On this occasion, the beam assigning section 107 may transmit, to the wireless terminal 200, a control signal for providing an instruction to skip reception processing of data to be requested to be retransmitted. In addition, the beam assigning section 107 may perform control to acquire information relating to a period for transmitting the pieces of second data, e.g., information relating to a frame rate of an moving image from the image processor 102, and discard, skip, or not transmit pieces of second data that is not able to be transmitted in one frame period of the moving image.

Thus, according to the first embodiment of the present technology, a correspondence between data and beams is determined and transmitted on the basis of priorities corresponding to importance of data and evaluation of beam quality, which makes it possible to properly transmit a plurality of pieces of data with use of a plurality of beams. That is, it is possible to increase the amount of data transmittable in each unit time, and it is possible to reduce transmission time for each unit data amount and achieve low latency.

2. Second Embodiment

[Data Distribution Device]

FIG. 23 is a diagram illustrating a configuration example of the data distribution device 100 according to a second embodiment of the present technology. It is to be noted that the overall configuration of the wireless communication system is similar to that in the first embodiment described above, and detailed description thereof is omitted.

The data distribution device 100 according to the second embodiment differs from the first embodiment described above in that a frequency managing section 114 is further included. The frequency managing section 114 manages use frequency bands while classifying the use frequency bands into at least a licensed band and an unlicensed band. In addition, in the second embodiment, the wireless terminal 200 has such a function of managing the use frequency bands in, for example, the controller 201.

The beam evaluating section 106 evaluates each of a plurality of beams for each of the licensed band and the unlicensed band on the basis of quality. Here, an appropriately changeable offset amount may be added to quality of beams in the unlicensed band. For example, the offset amount is added on the basis of a communication success rate in any given period to decrease reception quality in a case where the success rate is low. That is, adding this offset amount to quality of beams in the unlicensed band that may be deteriorated due to an interference from another system or the like makes it possible to perform relative evaluation with respect to the licensed band. Here, the offset amount may be set in accordance with wireless resource occupancy (radio resource occupancy), that is, a traffic load (load).

The beam assigning section 107 determines a correspondence between at least a piece of data having the lowest priority among pieces of second data having different priorities and any given beam set in the unlicensed band, on the basis of quality of beams. Here, in a case where the receiver 111 receives a control signal for requesting retransmission of specific data transmitted using the unlicensed band, the beam assigning section 107 determines a correspondence between a piece of second data to be retransmitted and any given beam set in the licensed band. For example, the correspondence between the piece of second data to be retransmitted and a beam having the highest beam rank set in the licensed band is determined.

In addition, the data distribution device 100 may also cooperate or collaborate with another base station device (e.g., a macrocell or a small cell) to generate a multi-beam. For example, a base station device that operates in the licensed band and the data distribution device 100 that operates in the licensed band may generate a plurality of transmit beams within the same time. In addition, a base station device that operates in the licensed band and the data distribution device 100 that operates in the unlicensed band may generate a plurality of transmit beams within the same time.

Thus, according to the second embodiment, it is possible to evaluate beams in accordance with characteristics of use frequency bands, and it is possible to determine a correspondence between data and beams more properly.

3. Third Embodiment

[Data Distribution Device]

FIG. 24 is a diagram illustrating a configuration example of the data distribution device 100 according to a third embodiment of the present technology. It is to be noted that the overall configuration of the wireless communication system is similar to that in the first embodiment described above, and detailed description thereof is omitted.

The data distribution device 100 according to the third embodiment differs from the second embodiment described above in that an acquisition ratio acquiring section 115 is further included.

The acquisition ratio acquiring section 115 acquires information relating to a ratio of a data amount that has actually been acquired by the wireless terminal 200 to a total amount of the first data that is supposed to be acquired in any given time interval from the wireless terminal 200 through the receiver 111. For example, the given time interval is a time interval that is an inverse of a frame rate of a moving image. For example, in a case where the frame rate is 60 fps (frame/second), an inverse thereof is 16.667 ms (milliseconds).

Accordingly, in the third embodiment, the wireless terminal 200 has a function of calculating an acquisition ratio of a data amount that has actually been acquired to a total amount of data that is supposed to be acquired by the image processor 207 in a time interval in, for example, the controller 201.

It is to be noted that the time interval may be variable on the basis of a change in the frame rate. Here, the total amount of the first data that is supposed to be acquired in the given time interval is, for example, a data amount of 49.7664 Mb (1920 pixels×1080 pixels×24 bits) that is supposed to be received for each frame in a case of a full-HD image (RGB24 format).

In a case where the acquisition ratio acquired by the acquisition ratio acquiring section 115 falls below a threshold, the image processor 102 performs, for example, processing to decrease resolution of a region having low importance in an image region and decrease the total amount of the first data that is supposed to be acquired in a time interval by the wireless terminal 200. Here, the threshold is settable or variable from a network.

It is to be noted that in a case where the use frequency band is managed, the wireless terminal 200 receives, from the data distribution device 100, a signal including a threshold relating to a dynamically settable acquisition ratio. In addition, in a case where the acquisition ratio exceeds the threshold, a signal including a request for adding a frequency band belonging to the unlicensed band is transmitted to the data distribution device 100.

Thus, according to the third embodiment of the present technology, decreasing resolution of a region having low importance in accordance with the acquisition ratio in the wireless terminal 200 makes it possible to transmit data that is supposed to be transmitted in any given time more properly.

4. Fourth Embodiment

[Data Distribution Device]

FIG. 25 is a diagram illustrating a configuration example of the data distribution device 100 according to a fourth embodiment of the present technology. It is to be noted that the overall configuration of the wireless communication system is similar to that in the first embodiment described above, and detailed description thereof is omitted.

The data distribution device 100 according to the fourth embodiment differs from the third embodiment described above in that an acceleration acquiring section 116 is further included.

The acceleration acquiring section 116 acquires information of an acceleration sensor mounted on the wireless terminal 200 through the receiver 111. For example, in a case where the wireless terminal 200 is a head mounted display, acceleration associated with movement of a head is detected.

The image processor 102 decreases, for example, resolution of a region other than a region having high importance in an image region in a case where acceleration acquired by the acceleration acquiring section 116 or any given numeric value calculated from the acceleration exceeds a threshold. This reduces the total amount of the first data that is supposed to be acquired by the wireless terminal 200 in a time interval. In addition, the image processor 102 may perform control to decrease a range of the region having high importance throughout a period in which the given numeric value calculated from the acceleration exceeds the threshold.

Here, the wireless terminal 200 may establish at least two PDU (Protocol Data Unit) sessions including a PDU session for communicating data including an image and a PDU session for communicating information relating to the acceleration sensor with the data distribution device 100. For example, the PDU session for communicating the information relating to the acceleration sensor may be a PDU session for communication in a mode called URLLC (Ultra-Reliable and Low Latency Communications), and may request a network to establish a PDU session for supporting URLLC through Requested NSSAI (Network Slice Selection Assisted Information).

Thus, according to the fourth embodiment of the present technology, decreasing resolution of a region having low importance in accordance with acceleration caused in the wireless terminal 200 makes it possible to perform data transmission more properly.

5. Fifth Embodiment

[Data Distribution Device]

FIG. 26 is a diagram illustrating a configuration example of the data distribution device 100 and an image processing server according to a fifth embodiment of the present technology. It is to be noted that the overall configuration of the wireless terminal 200 is similar to that in the first embodiment described above, and detailed description thereof is omitted.

In the fifth embodiment, the data distribution device 100 does not perform image processing by itself, and handles data from an image processing server 140. For example, the image processing server 140 supports a network function called DN (Data network) in NGC (Next Generation Core) or 5GC (5G Core), or a function of MEC (Mobile Edge Computing).

The image processing server 140 includes an application 141, an image processor 142, a priority controller 143, and a data output section 144. The image processing server 140 is implemented on, for example, a cloud server or an edge server.

The application 141 is, for example, an application for transmitting and receiving large-capacity moving images typified by games and viewing of moving image contents. In the present embodiment, the application 141 initiates construction of dedicated bearers (dedicated bearers) corresponding to different priorities assigned to the plurality of pieces of second data divided by the dividing section 104. For example, in EUTRAN (Evolved UMTS Radio Access Network) that is a fourth generation mobile communication system, QoS is controlled in units of EPS bearers (Evolved Packet System Bearers); therefore, a radio bearer (Radio Bearer) having a one-to-one correspondence with each piece of second data to which a QCI (QoS Class Identifier) is assigned is constructed between UE and an eNB. In contrast, in 5G, QoS is controlled in flow units; therefore, a radio bearer having an N (here, N is an integer of 1 or more)-to-one correspondence with each piece of second data to which a 5QI is assigned, that is, a QoS flow is constructed between UE and a gNB. In 5G, a plurality of QoS flows may be assigned to one radio bearer.

The image processor 142 performs generation, processing, compression, decompression processing, and the like of moving images.

The priority controller 143 assigns a priority corresponding to the degree of importance to data processed by the image processor 142 for each given data unit.

The data output section 144 outputs, as first data, data to which priorities are assigned in accordance with the degrees of importance to the data distribution device 100.

It is to be noted that a concept including a part or the entirety of processing in the application 141, the image processor 142, and the priority controller 143 may be regarded as an application.

The data distribution device 100 according to the fifth embodiment includes a bearer generator 118 and a bearer assigning section 119, as compared with a case of the first embodiment described above.

On the basis of information relating to the types of priorities notified from the priority controller 143 of the image processing server 140 and the maximum number of beams simultaneously receivable by the wireless terminal 200, the bearer generator 118 generates, between the data distribution device 100 and the wireless terminal 200, radio bearers to which OCIs or 5QIs corresponding to the types of priorities are assigned. It is to be noted that information relating to the types of priorities notified by the priority controller 143 of the image processing server 140 is notified to the bearer generator 118 during processing of constructing the radio bearers described above. Here, access categories may be set in place of constructing the radio bearers to which QCIs or 5QIs are assigned.

The beam assigning section 107 performs processing of assigning each beam upon multi-beam transmission to each bearer generated by the bearer generator 118. FIG. 27 is a diagram illustrating an example of beam assignment processing according to the fifth embodiment of the present technology. For example, TX_BM3 is assigned to a bearer having QCI #1 that is the highest priority, and TX_BM4 and TX_BM5 are assigned to a bearer having QCI #4 that is the lowest priority. That is, the beam assigning section 107 determines a correspondence between each of a plurality of beams and each of a plurality of dedicated bearers.

An data input section 117 acquires the first data having assigned priorities processed by the image processing server 140, and the dividing section 104 divides the first data on the basis of the priorities to form pieces of second data associated with the priorities.

The bearer assigning section 119 assigns pieces of second data corresponding to the priorities to bearers to which the QCIs or 5QIs are assigned. FIG. 28 is a diagram illustrating an example of bearer assignment processing according to the fifth embodiment of the present technology. Here, the data distribution device 100 having a function of a base station device and the image processing server 140 may be directly coupled to each other with use of a method called local breakout (Local Breakout), or may be coupled to each other through a core network called EPC (Evolved Packet Core) for fourth generation mobile communication system (4G) generation, or NGC (Next Generation Core)/5GC (5G Core) for fifth generation mobile communication system (5G) generation.

In a case where the data distribution device 100 and the image processing server 140 are coupled to each other through a 4G core network, a bearer paired with a radio bearer as described above is also constructed between the data distribution device 100 and the image processing server 140, and a bearer to which each end-to-end (End To End) QCI is assigned is equivalently constructed between the image processing server 140 and the wireless terminal 200. In this case, processing in the dividing section 104 and the bearer assigning section 119 of the data distribution device 100 is implemented on side of the image processing server 140. In the processing in the bearer assigning section 119 of the data distribution device 100, processing is performed to map a plurality of bearers constructed between the data distribution device 100 and the image processing server 140 to a plurality of radio bearers constructed between the data distribution device 100 and the wireless terminal 200 on the basis of the QCIs assigned to the respective bearers.

In a case where the data distribution device 100 and the image processing server 140 are coupled to each other through a 5G core network, one GTP-U tunnel on an N3 interface corresponding to one PDU session is constructed between the data distribution device 100 having a function of gNB and a network function called a UPF (User Plane Function) of the 5G core network. Data to be transmitted from the image processing server 140 to the UPF is a flow unit, and in the UPF, a 5QI is assigned to the data in accordance with a priority. A plurality of QoS flows to which 5QIs are assigned in the UPF is assigned to one GTP-U tunnel, and is transferred to the data distribution device 100. One or more radio bearers are constructed between the data distribution device 100 and the UE, and each of the QoS flows is assigned to any one of the radio bearers. That is, a plurality of 5QIs may be assigned to one radio bearer. Furthermore, the beam assigning section 107 causes each beam upon multi-beam transmission and each 5QI to correspond to each other. Thus, the beam assigning section 107 is able to assign one radio bearer to a plurality of beams.

The bearer generator 118 may detect, for example, a change in reception quality for each transmit beam in association with mobility of the wireless terminal 200 through the beam evaluating section 106, and may dynamically update setting of the radio bearers constructed between the data distribution device 100 and the wireless terminal 200. Here, dynamic update of setting of the radio bearers may include addition of a new radio bearer, removal of a specific bearer, and a change in the assigned QCI or 5QI. Furthermore, the beam assigning section 107 changes a correspondence with each beam upon multi-beam transmission assigned to each updated bearer in accordance with dynamic update of setting of the radio bearers.

In addition, the bearer generator 118 may dynamically update setting of the radio bearers constructed between the data distribution device 100 and the wireless terminal 200, for example, in association with a change in information relating to the types of priorities notified from the priority controller 143 of the image processing server 140. Here, dynamic update of setting of the radio bearers may include addition of a new radio bearer, removal of a specific bearer, and a change in the assigned QCI or 5QI.

Thus, according to the fifth embodiment of the present technology, a correspondence between data and beams is determined and transmitted on the basis of the QCIs or the 5QIs further assigned to the radio bearers, which makes it possible to properly transmit a plurality of pieces of data with use of a plurality of beams.

It is to be noted that the above-described embodiments provide examples for embodying the present technology and the matters in the embodiments and the invention-specifying matters in the scope of claims are associated. Similarly, the invention-specifying matters in the scope of claims and the matters in the embodiments of the present technology, which are denoted by the identical names, have correspondence. It should be noted that the present technology is not limited to the embodiments and can be embodied by making various modifications to the embodiments without departing from its essence.

Further, processing procedures described in the above-described embodiments may be construed as methods including those series of procedures or a program for causing a computer to execute those series of procedures or may be construed as a recording medium storing such programs. As the recording medium, a CD (Compact Disc), an MD (Mini Disc), a DVD (Digital Versatile Disc), a memory card, a Blu-ray disc (Blu-ray (registered trademark) Disc), and the like may be used, for example.

It is to be noted that the effects described in the present specification are mere examples and should not be limited, and other effects may also be provided.

It is to be noted that the present technology may also have the following configurations.

(1)
A wireless communication device including:
  a dividing section that divides first data generated in an application into a plurality of pieces of second data;
  a priority assigning section that assigns a priority to each of the plurality of pieces of second data divided;
  a transmitter that transmits the plurality of pieces of second data by wireless communication with use of a plurality of antenna elements;
  an antenna controller that sets a plurality of beams in a same first time interval or in different first time intervals upon transmission of the plurality of pieces of second data by the transmitter;
  a beam quality acquiring section that acquires quality of each of the plurality of beams;
  a beam evaluating section that performs evaluation of the plurality of beams on the basis of quality of each of the beams;
  a beam assigning section that determines a correspondence between the plurality of beams and the plurality of pieces of second data on the basis of the evaluation and the priority; and
  a controller that controls the transmitter to transmit the plurality of pieces of second data through the corresponding plurality of beams.

(2)
The wireless communication device according to (1), in which the controller performs control to transmit the plurality of pieces of second data through the corresponding plurality of beams in the same first time interval by spatial multiplexing.

(3)
The wireless communication device according to (1) or (2), in which
  the antenna controller sets each of the plurality of beams in the different first time intervals, and
  the beam quality acquiring section acquires quality of each of the plurality of beams set in the different first time intervals.

(4)
The wireless communication device according to any one of (1) to (3), in which
  the beam assigning section further selects beams having quality higher than a threshold from the plurality of beams on the basis of the threshold, determines, for a plurality of pieces of third data equal in number to the selected beams among the plurality of pieces of second data, a correspondence between each of the selected beams and each of priorities of the plurality of pieces of third data on the basis of the evaluation, and determines a correspondence between a plurality of unselected beams and any one piece of fourth data among the plurality of pieces of second data, and
  the controller performs control to transmit the plurality of third data in the same first time interval through each of the corresponding beams by spatial multiplexing, and performs control to transmit the one piece of fourth data in the same first time interval through the corresponding plurality of beams.

(5)
The wireless communication device according to (4), in which the transmitter transmits, to another wireless communication device, at least one of information relating to the plurality of beams corresponding to the plurality of pieces of third data, or information relating to the plurality of beams corresponding to the one piece of fourth data.

(6)
The wireless communication device according to any one of (1) to (5), further including a receiver that receives, from another wireless communication device, a retransmission request signal for requesting retransmission of specific data among the plurality of pieces of second data transmitted to the other wireless communication device by the transmitter, in which
  the beam assigning section determines a correspondence between the specific data and a beam having highest quality on the basis of the evaluation.

(7)
The wireless communication device according to any one of (1) to (6), further including a frequency managing section that manages use frequency bands while classifying the use frequency bands into at least a licensed band and an unlicensed band, in which the beam evaluating section performs evaluation of the plurality of beams for each of the licensed band and the unlicensed band, and the beam assigning section determines a correspondence between at least data having lowest priority among the plurality of pieces of second data and any given beam set in the unlicensed band, on the basis of the evaluation.

(8)

The wireless communication device according to (7), further including a receiver that receives, from another wireless communication device, a retransmission request signal for requesting retransmission of specific data transmitted with use of the unlicensed band among the plurality of pieces of second data transmitted to the other wireless communication device by the transmitter, in which the beam assigning section determines a correspondence with any given beam set in the licensed band on the basis of management by the frequency managing section.

(9)

The wireless communication device according to any one of (1) to (8), further including:

a receiver that receives, from another wireless communication device, a signal including information relating to an acquisition ratio of a data amount that has actually been acquired to a total amount of the first data that is supposed to be acquired in a second time interval that is dynamically settable; and an image processor that processes image information to be displayed by the other wireless communication device, and changes resolution of at least data having lowest priority among the plurality of pieces of second data on the basis of the information relating to the acquisition ratio.

(10)

The wireless communication device according to (9), in which the second time interval is an inverse of a frame rate of a moving image.

(11)

The wireless communication device according to any one of (1) to (10), further including:

a receiver that receives, from another wireless communication device, a signal including information relating to an acceleration sensor mounted on the other wireless communication device; and an image processor that processes image information to be displayed by the other wireless communication device, and changes resolution of data having a priority other than data having highest priority among the plurality of pieces of second data on the basis of the information relating to the acceleration sensor.

(12)

The wireless communication device according to any one of (1) to (1), in which the first time interval is a time in units of subframes or slots of a wireless frame in the wireless communication.

(13)

The wireless communication device according to any one of (1) to (12), in which the antenna controller performs control to dispose the plurality of antenna elements on one antenna panel, divide the plurality of antenna elements into two or more groups, and cause antenna elements included in each of the divided groups to generate one beam among the plurality of beams.

(14)

The wireless communication device according to any one of (1) to (12), in which the plurality of antenna elements are divided into and disposed on a plurality of antenna panels, and the antenna controller performs control to divide a plurality of antenna elements separately disposed on the plurality of antenna panels into two or more groups, and cause the antenna elements included in each of the divided groups to generate one beam among the plurality of beams.

(15)

The wireless communication device according to any one of (1) to (14), in which the application initiates construction of a plurality of dedicated bearers corresponding to priorities assigned to the plurality of pieces of second data divided.

(16)

The wireless communication device according to (15), in which the beam assigning section determines a correspondence between each of the plurality of beams and each of the plurality of dedicated bearers.

(17)

A wireless communication device including:

an antenna section including a plurality of antenna elements;

a transmitter-receiver that receives a signal and data from another wireless communication device and transmits a signal to the other wireless communication device;

a measuring section that measures a plurality of first beams transmitted from the other wireless communication device;

an identifying section that identifies the first beams on the basis of identification information of the first beam acquired through the signal received from the other wireless communication device;

an antenna controller that sets a plurality of second beams with respect to the plurality of antenna elements;

a specifying section that specifies setting of the second beams that maximizes reception quality of each of the plurality of first beams measured by the measuring section;

a beam quality information generator that generates beam quality information relating to a correspondence between the identification information of the first beam and reception quality measured by setting of the second beams specified by the specifying section for each identification information of the first beam, and causes the transmitter-receiver to transmit the beam quality information;

a spatial demultiplexing section that separates spatially multiplexed data on the basis of information relating to a first combination including identification information of a plurality of first beams with which spatially multiplexed data is transmitted among the plurality of first beams; and a combining section that combines same data transmitted with use of a plurality of first beams by diversity on the basis of information relating to a second combination including identification information of a plurality of first beams with which the same data is transmitted by diversity.

(18)

The wireless communication device according to (17), in which data to be received from the other wireless communication device includes image information to be updated at each dynamically settable time interval, a signal to be received from the other wireless communication device includes information relating to a format of the image information, and the wireless communication device further includes an image processor that arranges each first data separated by the spatial demultiplexing section in the time interval and second data combined by the combining section on the basis of the format of the image information.

(19)

The wireless communication device according to (18), further including a calculating section that calculates an acquisition ratio of a data amount that has actually been acquired to a total amount of data that is supposed to be acquired by the image processor in the time interval, in which the transmitter-receiver transmits a signal including the acquisition ratio to the other wireless communication device.

(20)

The wireless communication device according to (19), further including a frequency managing section that manages use frequency bands while classifying the use frequency bands into at least a licensed band and an unlicensed band, in which the transmitter-receiver receives a signal including a threshold relating to a dynamically settable acquisition ratio from the other wireless communication device, and transmits a signal including a request for adding a frequency band belonging to the unlicensed band to the other wireless communication device in a case where the acquisition ratio exceeds the threshold relating to the acquisition ratio.

REFERENCE SIGNS LIST

100: data distribution device
101: application
102: image processor
103: priority controller
104: dividing section
105: priority assigning section
106: beam evaluating section
107: beam assigning section
108: controller
109: antenna controller
110: transmitter
111: receiver
112: beam measuring section
113: transmit beam number setting section
114: frequency managing section
115: acquisition ratio acquiring section
116: acceleration acquiring section
117: data input section
118: bearer generator
119: bearer assigning section
140: image processing server
141: application
142: image processor
143: priority controller
144: data output section
191 to 195: antenna panel
200: wireless terminal
201: controller
202: receiver
203: antenna controller
204: transmitter
205: spatial demultiplexing section
206: diversity combining section
207: image processor
208: display section

The invention claimed is:

1. A first wireless communication device, comprising:
a dividing section configured to divide first data generated in an application into a plurality of pieces of second data;
a priority assigning section configured to assign a priority to each of the plurality of pieces of second data divided;
a transmitter configured to transmit the plurality of pieces of second data based on wireless communication, wherein the wireless communication is based on a plurality of antenna elements;
an antenna controller configured to set a plurality of beams in a same first time interval or in different first time intervals based on transmission of the plurality of pieces of second data by the transmitter;
a beam quality acquiring section configured to acquire quality of each of the plurality of beams;
a beam evaluating section configured to evaluate the plurality of beams based on the acquired quality of each of the plurality of beams;
a beam assigning section configured to:
determine a correspondence between the plurality of beams and the plurality of pieces of second data based on the evaluation and the priority;
select at least two beams from the plurality of beams having quality higher than a threshold;
determine, for a plurality of pieces of third data among the plurality of pieces of second data equal in number to the selected at least two beams, a correspondence between each of the selected at least two beams and each of priorities of the plurality of pieces of third data based on the evaluation;
determine a correspondence between a plurality of unselected beams from the plurality of beams and a piece of fourth data among the plurality of pieces of second data; and
a controller configured to:
control transmission of the plurality of pieces of second data through the corresponding plurality of beams,
control transmission of the plurality of third data in the same first time interval through each of the corresponding beams by spatial multiplexing; and
control transmission of the piece of fourth data in the same first time interval through the corresponding plurality of beams.

2. The first wireless communication device according to claim 1, wherein the controller is further configured to control the transmission of the plurality of pieces of second data through the corresponding plurality of beams in the same first time interval by spatial multiplexing.

3. The first wireless communication device according to claim 1, wherein
the antenna controller is further configured to set each of the plurality of beams in the different first time intervals, and
the beam quality acquiring section is further configured to acquire quality of each of the plurality of beams set in the different first time intervals.

4. The first wireless communication device according to claim 1, wherein the transmitter is further configured to transmit, to a second wireless communication device, at least one of information relating to the plurality of beams corresponding to the plurality of pieces of third data, or information relating to the plurality of beams corresponding to the piece of fourth data.

5. The first wireless communication device according to claim 1, further comprising a receiver configured to receive, from a second wireless communication device, a retransmission request signal to request retransmission of specific data among the plurality of pieces of second data transmitted to the second wireless communication device by the transmitter, wherein
the beam assigning section is further configured to determine a correspondence between the specific data and a specific beam of the plurality of beams having highest quality based on the evaluation.

6. The first wireless communication device according to claim 1, further comprising:
a frequency managing section configured to control management of use frequency bands simultaneously with classification of the use frequency bands into at least a licensed band and an unlicensed band, wherein
the beam evaluating section is further configured to evaluate of the plurality of beams for each of the licensed band and the unlicensed band, and
the beam assigning section is further configured to determine a correspondence between at least data having lowest priority among the plurality of pieces of second data and a beam set in the unlicensed band, based on the evaluation.

7. The first wireless communication device according to claim 6, further comprising a receiver configured to receive, from a second wireless communication device, a retransmission request signal to request retransmission of specific data transmitted with use of the unlicensed band among the plurality of pieces of second data transmitted to the second wireless communication device by the transmitter, wherein
the beam assigning section is further configured to determine a correspondence with a beam set in the licensed band based on the management by the frequency managing section.

8. The first wireless communication device according to claim 1, further comprising:
a receiver configured to receive, from a second wireless communication device, a signal including information relating to an acquisition ratio of a data amount that is acquired to a total amount of the first data that is supposed to be acquired in a second time interval that is dynamically settable; and
an image processor configured to:
process image information that is displayed by the second wireless communication device, and
change resolution of at least data having lowest priority among the plurality of pieces of second data based on the information relating to the acquisition ratio.

9. The first wireless communication device according to claim 8, wherein the second time interval is an inverse of a frame rate of a moving image.

10. The first wireless communication device according to claim 1, further comprising:
a receiver configured to receive, from a second wireless communication device, a signal including information relating to an acceleration sensor mounted on the second wireless communication device; and
an image processor configured to
process image information displayed by the second wireless communication device, and
change resolution of data having a priority different from data having highest priority among the plurality of pieces of second data based on the information relating to the acceleration sensor.

11. The first wireless communication device according to claim 1, wherein the first time interval is a time in units of subframes or slots of a wireless frame in the wireless communication.

12. The first wireless communication device according to claim 1, wherein the antenna controller is further configured to:
control disposition of the plurality of antenna elements on one antenna panel,
divide the plurality of antenna elements into at least two groups, and
control antenna elements included in each of the divided at least two groups to generate one beam among the plurality of beams.

13. The first wireless communication device according to claim 1, wherein the antenna controller is further configured to:
divide the plurality of antenna elements;
control disposition of the divided plurality of antenna elements on a plurality of antenna panels;
divide each of the divided plurality of antenna elements separately disposed on the plurality of antenna panels into at least two groups; and
control the antenna elements included in each of the divided at least two groups to generate one beam among the plurality of beams.

14. The first wireless communication device according to claim 1, wherein the application is configured to initiate construction of a plurality of dedicated bearers corresponding to priorities assigned to the plurality of pieces of second data.

15. The first wireless communication device according to claim 14, wherein the beam assigning section is further configured to determine a correspondence between each of the plurality of beams and each of the plurality of dedicated bearers.

16. A first wireless communication device, comprising:
an antenna section including a plurality of antenna elements;
a transmitter-receiver configured to:
receive a first signal and data from a second wireless communication device, wherein
the data includes image information updated at each dynamically settable time interval, and
the first signal includes information relating to a format of the image information and identification information of a plurality of first beams; and
transmit a second signal to the second wireless communication device;
a measuring section configured to measure the plurality of first beams transmitted from the second wireless communication device;
an identifying section configured to identify the plurality of first beams based on the identification information of a first beam of the plurality of first beams acquired through the first signal received from the second wireless communication device;
an antenna controller configured to set a plurality of second beams with respect to the plurality of antenna elements;
a specifying section configured to specify a set of the plurality of second beams to maximize reception quality of each of the plurality of first beams measured by the measuring section;
a beam quality information generator configured to:

generate beam quality information relating to a correspondence between the identification information of the first beam and reception quality measured by the set of the plurality of second beams specified by the specifying section for each identification information of each beam of the plurality of first beams, and control the transmitter-receiver to transmit the beam quality information;

a spatial demultiplexing section configured to separate spatially multiplexed data based on information relating to a first combination including identification information of the plurality of first beams with which spatially multiplexed data is transmitted;

a combining section configured to combine same data transmitted with use of a plurality of first beams by diversity based on information relating to a second combination including identification information of a plurality of first beams with which the same data is transmitted by diversity; and an image processor configured to arrange each of first data separated by the spatial demultiplexing section in the time interval and second data combined by the combining section based on the format of the image information.

17. The wireless communication device according to claim 16, further comprising a calculating section configured to calculate an acquisition ratio of a data amount that is acquired to a total amount of data that is supposed to be acquired by the image processor in the time interval, wherein
the transmitter-receiver is further configured to transmit a signal including the acquisition ratio to the second wireless communication device.

18. The wireless communication device according to claim 17, further comprising a frequency managing section configured to manage use frequency bands simultaneously with classification of the use frequency bands into at least a licensed band and an unlicensed band, wherein
the transmitter-receiver is further configured to:
receive a signal including a threshold relating to a dynamically settable acquisition ratio from the second wireless communication device, and
transmit a signal including a request for addition of a frequency band which belongs to the unlicensed band to the second wireless communication device based on a determination that the acquisition ratio exceeds the threshold relating to the acquisition ratio.

* * * * *